United States Patent [19]

Chatterjee

[11] Patent Number: 5,317,652
[45] Date of Patent: May 31, 1994

[54] ROTATION AND POSITION INVARIANT OPTICAL CHARACTER RECOGNITION

[75] Inventor: Chanchal Chatterjee, Sterling Heights, Mich.

[73] Assignee: Phoenix Imaging, Sterling Heights, Mich.

[21] Appl. No.: 710,840

[22] Filed: Jun. 5, 1991

[51] Int. Cl.$^5$ .......................... G06K 9/54; G06K 9/00
[52] U.S. Cl. ......................................... 382/49; 382/10
[58] Field of Search ....................... 382/10, 45, 46, 49, 382/41, 48, 30, 42

[56] References Cited

U.S. PATENT DOCUMENTS

| | | | |
|---|---|---|---|
| 3,160,854 | 12/1964 | Gregory | 340/146.3 |
| 3,873,972 | 3/1975 | Levine | 340/116.3 |
| 3,979,722 | 9/1976 | Sakoe | 340/146.3 AE |
| 4,066,998 | 1/1978 | Lidkea | 340/146.3 AC |
| 4,162,482 | 7/1979 | Su | 382/49 |
| 4,468,807 | 8/1984 | Moulton | 382/2 |
| 4,504,970 | 3/1985 | Werth et al. | 382/14 |
| 4,525,860 | 6/1985 | Boivie | 382/21 |
| 4,566,124 | 1/1986 | Yamamoto et al. | 382/21 |
| 4,628,532 | 12/1986 | Stone et al. | 382/21 |
| 4,630,309 | 12/1986 | Karow | 382/56 |
| 4,658,428 | 4/1987 | Bedros et al. | 382/46 |
| 4,672,676 | 6/1987 | Linger | 382/45 |
| 4,680,627 | 7/1987 | Sase et al. | 382/45 |
| 4,685,143 | 8/1987 | Choate | 382/25 |
| 4,712,248 | 12/1987 | Hongo | 382/22 |
| 4,742,556 | 5/1988 | Davis, Jr. et al. | 382/51 |
| 4,747,150 | 5/1988 | Knutsson et al. | 382/21 |
| 4,747,675 | 5/1988 | Nagler | 350/410 |
| 4,748,675 | 5/1988 | Suzuki et al. | 382/21 |
| 4,813,078 | 3/1989 | Fujiwara et al. | 382/21 |
| 4,817,172 | 3/1989 | Cho | 382/21 |
| 4,876,732 | 10/1989 | Miyagawa et al. | 382/46 |
| 4,878,248 | 10/1989 | Shyu et al. | 382/9 |
| 5,038,384 | 8/1991 | Oheba | 382/46 |

OTHER PUBLICATIONS

Schmitt et al. "The AIS-5000 Parallel Processor" IEEE Transactions on Pattern Analysis and Machine Intelligence 320-330, 1988.

Wilson, S. S., "Teaching Network Connections For Real Time Object Recognition", *Neural and Intelligent Systems Integration*, New York, pp. 135-160, 1992.

Wilson, S. S., "Order Statistic Filters on Matrices of Images", *Proc. of SPIE, Non-Linear Image Processing II*, vol. 1451, pp. 242-253, San Jose, 1991.

Wilson, S. S., "Teaching of Object Classes Using Mathematical Morphology", *SPIE/SPSE Symposium on Electronic Imaging: Science & Technology*, vol. 1658, San Jose, 1992.

Applied Intelligent Systems, Inc., "AIS-3000 Hardware Installation and Reference Manual", Ann Arbor, 1989.

*Primary Examiner*—Joseph Mancuso
*Assistant Examiner*—David Fox
*Attorney, Agent, or Firm*—Harness, Dickey & Pierce

[57] ABSTRACT

A character recognition system wherein the flexibility of the recognition task is expanded for orientation independence, position independence, and orientation and position independence. The system also provides a technique for implementing concurrency in the processing to achieve high speed without sacrificing performance. The system is readily implemented on conventional machine vision computing systems.

8 Claims, 16 Drawing Sheets

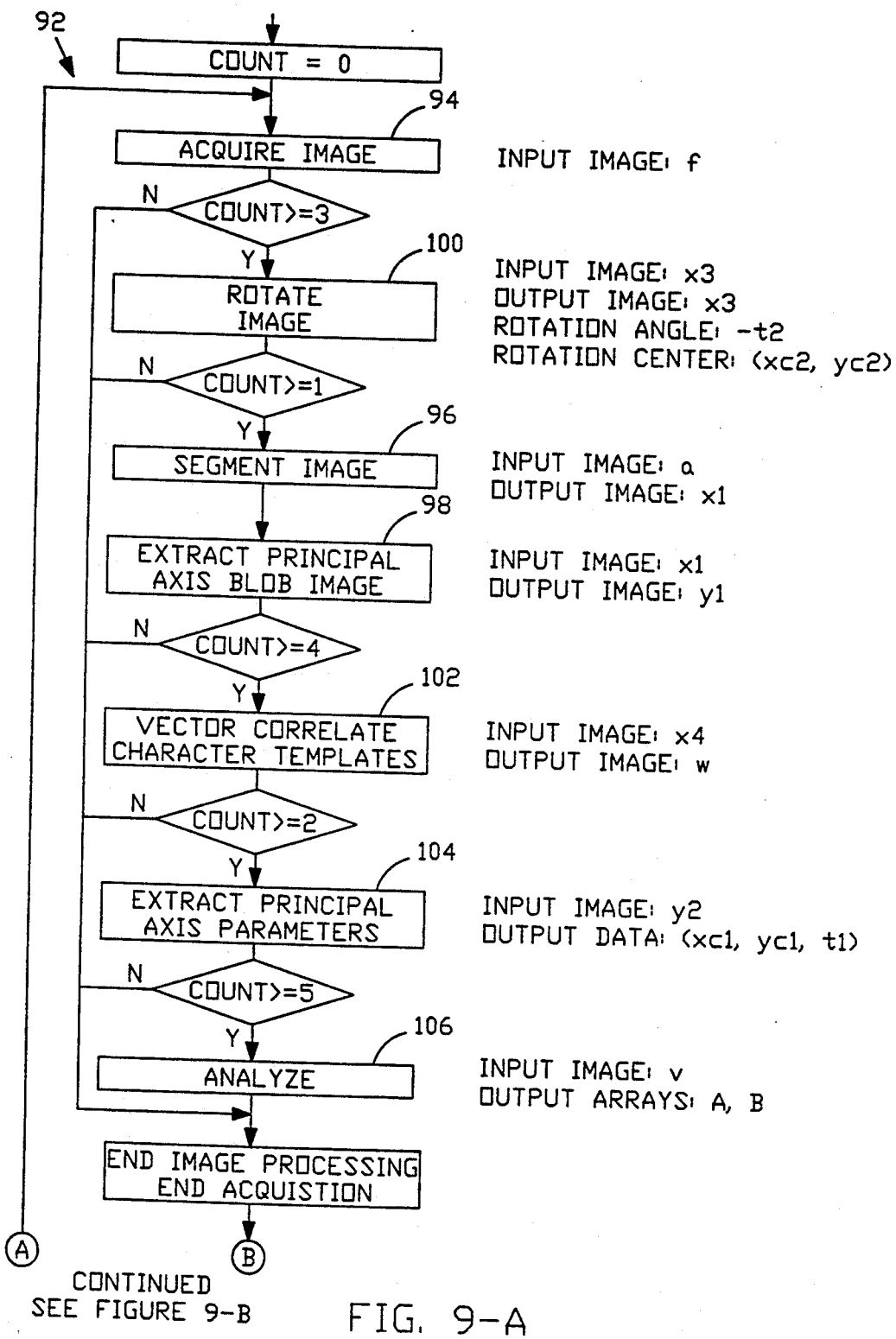
FIG. 9-A

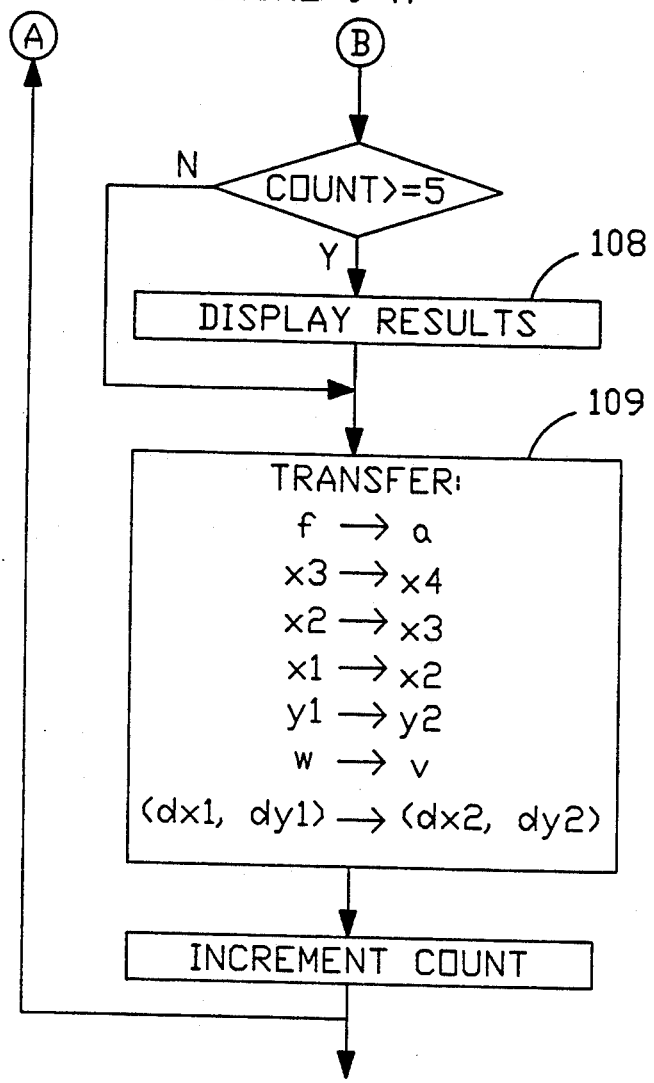
FIG. 9-B

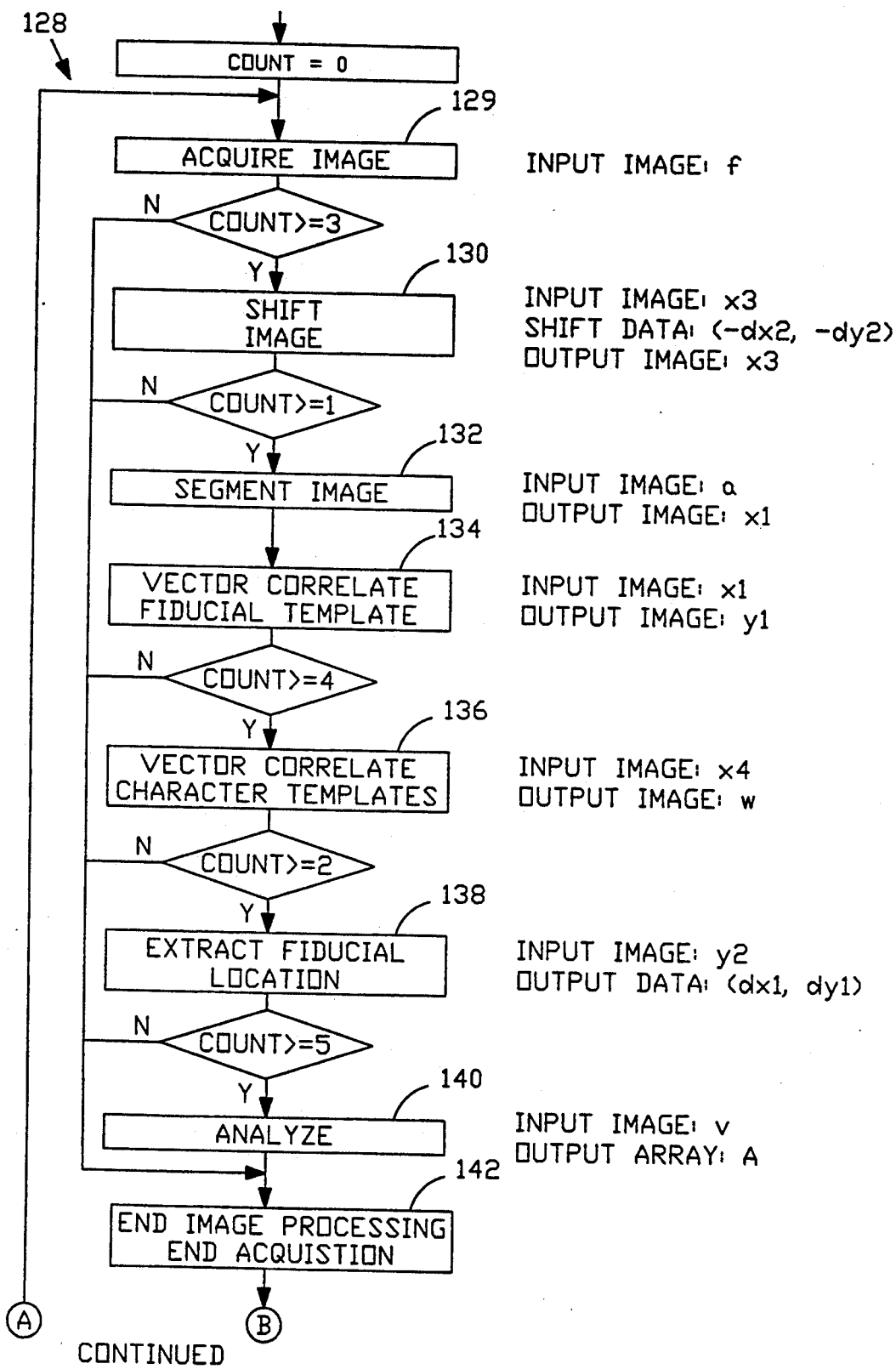
FIG. 11-A

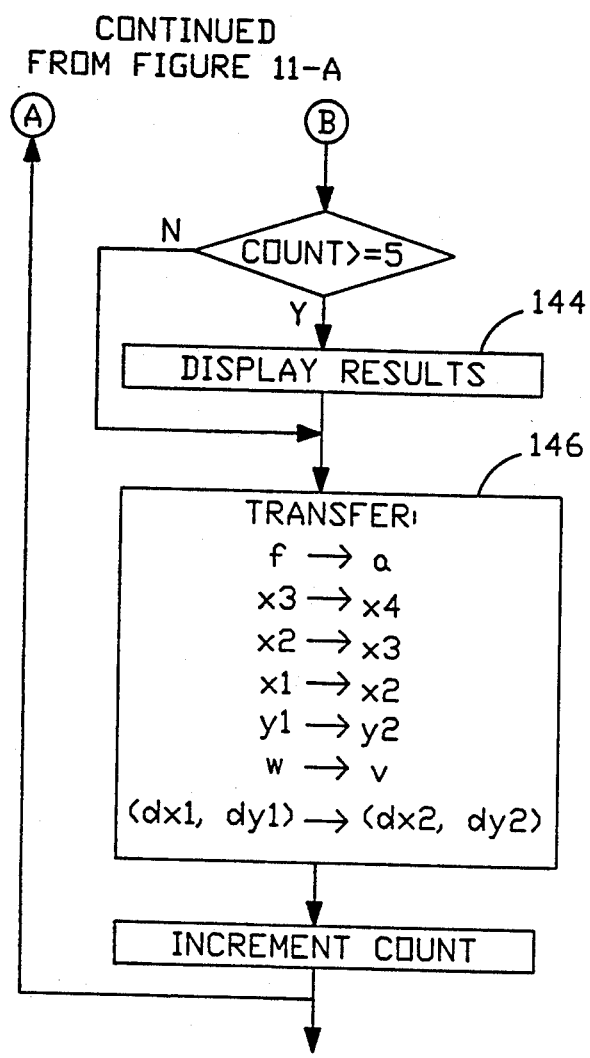
FIG. 11-B

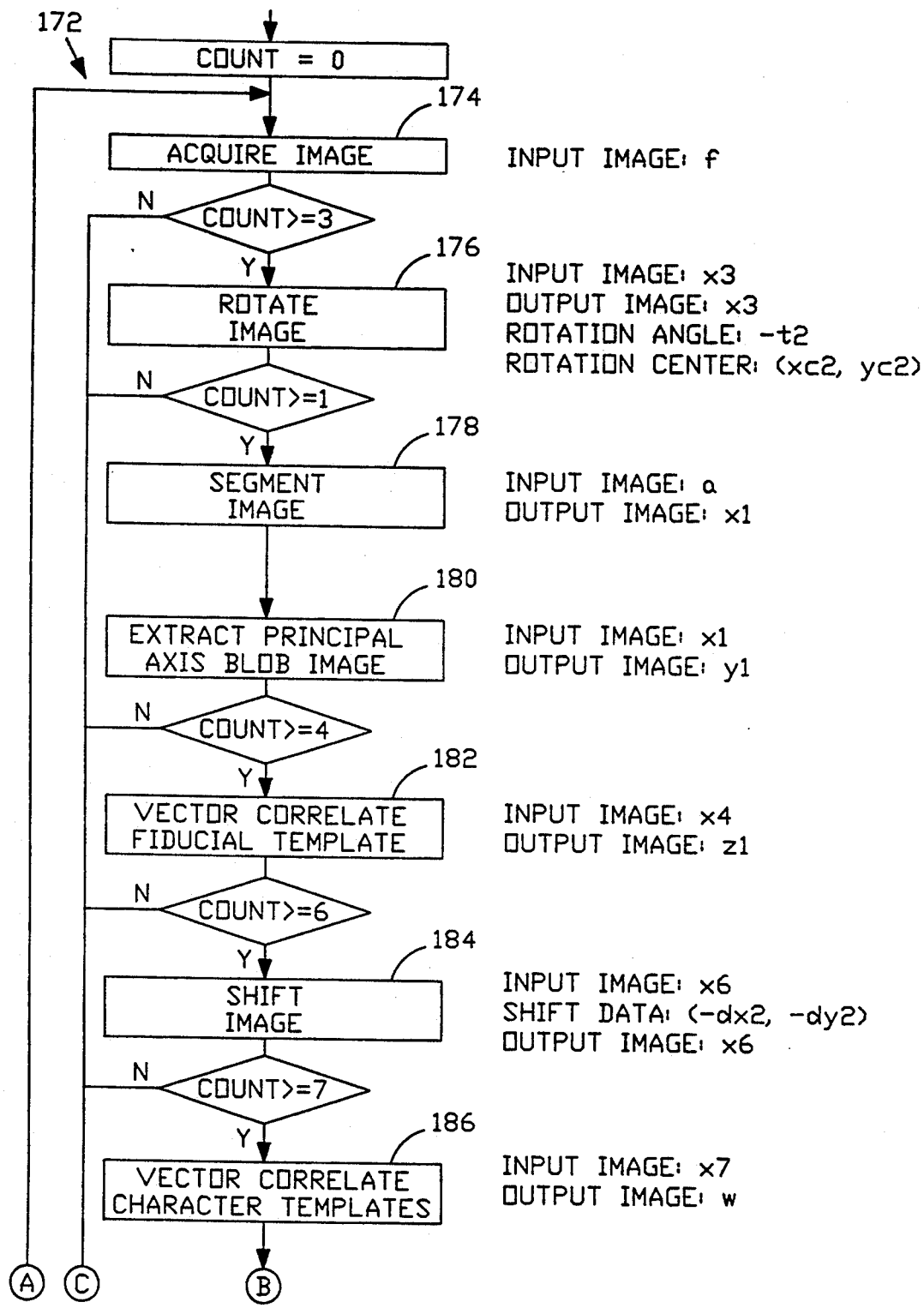
FIG. 13-A
CONTINUED SEE FIGURE 13-B

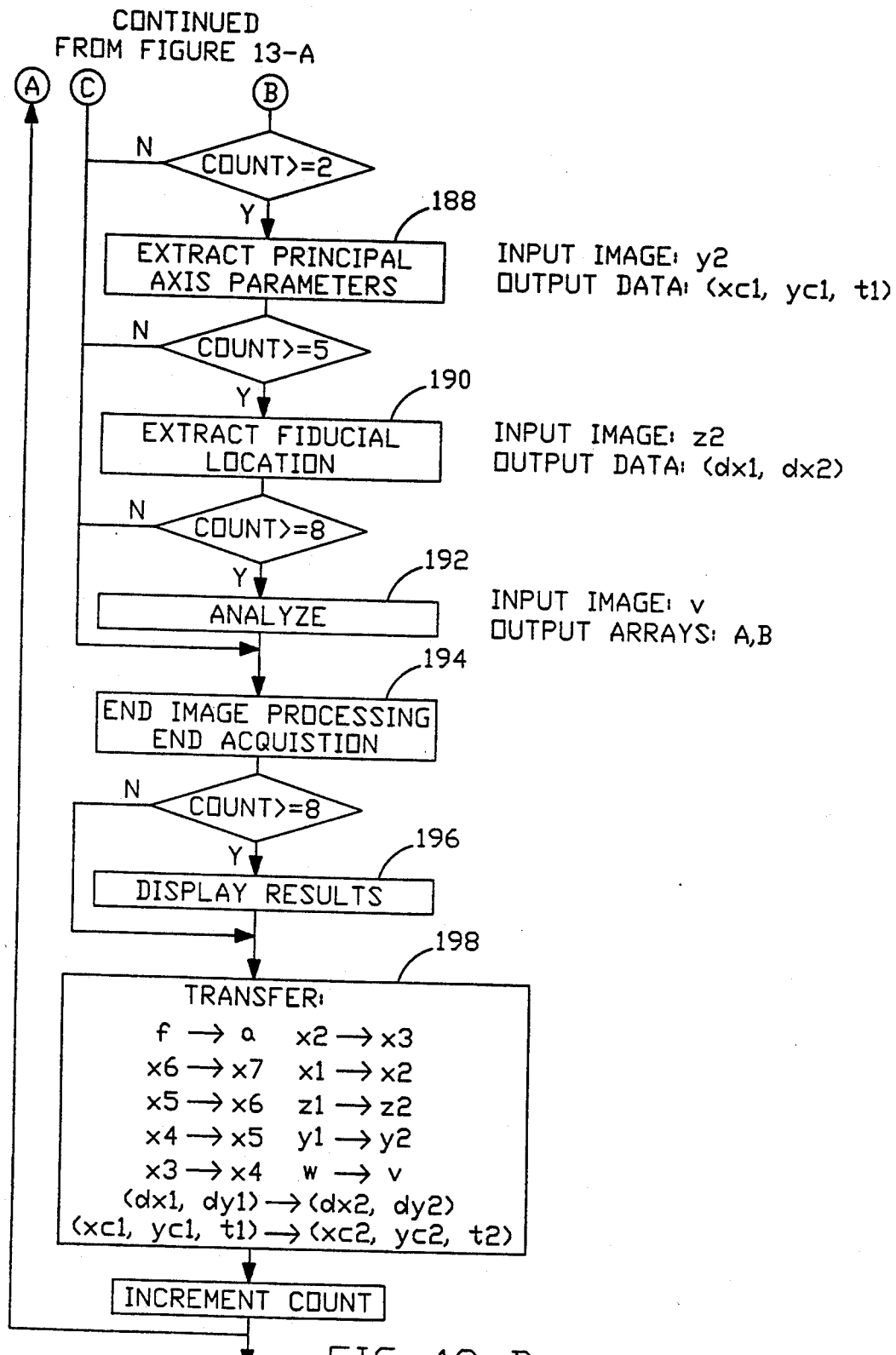
FIG. 13-B

ROTATION AND POSITION INVARIANT OPTICAL CHARACTER RECOGNITION

BACKGROUND OF THE INVENTION

1. Technical Field

This invention relates to image analysis systems, and more particularly to automated optical character recognition systems.

2. Discussion

Over the last few years, applications of machine vision to the areas of automated inspection and manufacturing have been increasing considerably. Among the areas of machine vision most pursued by various industries are: optical character recognition, defect inspection, gauging and, product counting. Of all these applications, optical character recognition ("OCR") has been of great importance to many industries, such as, pharmaceutical and packaging industries for a variety of reasons. Some of these reasons are:

(1) better quality of products,
(2) cost effectiveness of products,
(3) consistency of product quality,
(4) proper documentation of errors and
(5) better productivity.

In today's high speed manufacturing processes, it is important to maintain the quality of products without affecting the rate of productivity. Everyday stricter conditions are laid down for better product quality, particularly for the pharmaceutical industry. In this manufacturing environment, it is important to have correct labels and numbering on parts manufactured by an industry. Also, it is increasingly difficult for human inspectors to keep up with the speed of the manufacturing processes. With machine vision application of OCR technology, the speed of a manufacturing process can be maintained without relying on human inspectors. This requires less inspectors and a more cost effective manufacturing. Further, a machine vision system generates results in a consistent way and all errors are automatically documented for future processing.

Many different types of OCR equipment have been installed in different types of industrial environments over the past several years. This equipment includes optical sensing devices, such as television (TV) cameras, image processing units, display monitors for training and viewing and, other peripheral devices. The cameras are mounted in a given orientation to view the manufactured parts and then read characters from these parts in a fixed orientation. Also, character recognition on these parts is performed at a fixed location in the manufacturing line. This constrains the manufacturers to place the characters in a given orientation and at a very precise location on the parts.

These two constraints may not be achievable in many manufacturing scenarios. One example of such a scenario is the task of reading characters from bottle caps as these bottles come down a manufacturing line. The bottles rotate continuously as they move down this line. Thus the character set printed on the caps, which is to be recognized by the machine vision unit, also rotates continuously down the line. There is no guarantee that the character set will be presented at a fixed orientation in front of the camera. We can also have many situations where a character set is not printed at the same precise location on a part. An example of this would be characters stamped on a part by a stamping machine. Errors in the motion of the stamping machine or non-uniform movement of the part along the line, may cause the characters to be printed at different positions of the part at different times. Thus if the TV camera points to a fixed position on the part, it may not find the entire set of characters on the part even though all the characters are present on the part.

In order to overcome most (if not all) of the drawbacks of present OCR technology, it would be desirable to have an image analysis system which is capable of orientation and/or position independent character recognition.

SUMMARY OF THE INVENTION

Pursuant to the present invention, an image processor is provided which is capable of reading a set of characters independent of its orientation on the part and independent of its position on the part. The method of the present invention first locates the orientation or position of the set of characters and then reads them. In one embodiment, the invention also uses an image processing tool called "gray scale and binary image morphology" to separate the characters from the image and, then perform the recognition task. It also uses an image processing technique called "vector correlation" to recognize the characters separated by the previous methods. Also, in accordance with another embodiment there is presented a method of overlapping the tasks performed by the different processing units in a image processing system. This method of overlapped processing is called "concurrency". The method of "concurrency" presented herein improves the processing speed of the character recognition methods under both rotation and/or position independence. Consequently, the system and method of the present invention has the following advantages over conventional OCR technology:

(1) recognition irrespective of orientation of characters,
(2) recognition irrespective of position of characters,
(3) very high speed recognition of characters,
(4) recognition irrespective of position and orientation of characters,
(5) recognition of degraded or poor quality characters,
(6) accurate recognition, and
(7) recognition of symbols, as well as, characters.

A general model of character recognition consists of the following steps:

(1) image acquisition with a TV camera,
(2) segmentation of the acquired image to extract the character image,
(3) processing of the character image by vector correlation technique to extract data pertaining to individual characters,
(4) analysis of the vector correlation data to recognize the characters and,
(5) display the recognized character data.

Starting from the above conventional model of character recognition the invention introduces several steps of processing to include rotation independence, position independence and, rotation and position independence. For rotation independence the invention introduces 3 steps after step (2) i.e. segmentation of the acquired image. These steps are:

(1) perform image processing pertaining to orientation independence to extract a blob image, (2) compute the orientation of the character string by computing the orientation of the principal axis of the blob and, (3) rotate the characters about an axis to orient it horizontally across the image for recognition.

For position independent character recognition, the recognition is first done on the entire image to locate a given mark or "fiducial". Character recognition is then performed with respect to this "fiducial" location in the image. For this the invention introduces 3 steps after step (2) above, i.e. segmentation of the acquired image. The steps are:

(1) locate a mark or "fiducial" in the entire image,
(2) compute the displacement of this mark from its "nominal" position and,
(3) move the character image by this displacement to place it at its "nominal" position.

From the two methods mentioned above, a system for both position and orientation independent character recognition method is achieved by introducing the following steps after step (2) in the general model above i.e. segmentation of the acquired image.

(1) perform image processing pertaining to orientation independence to extract a blob image,
(2) compute the orientation of the principal axis of the blob from horizontal.
(3) rotate the character image about an axis to orient it horizontally across the image,
(4) locate a mark or "fiducial" in the entire image,
(5) compute the displacement of the "fiducial" from its "nominal" position,
(6) move the character image by this displacement to place it at its "nominal" position.

In accordance with another embodiment of the present invention there is presented a system for high speed recognition for both orientation and position independent character recognition methods. This model uses the computational concept of "concurrency". The image processing system consists of different processors. Each processor is designed to perform a specific type of task. For example, the camera is used to acquire an image. Often there are specialized processing units in the image processing computer to do image processing tasks such as image segmentation and vector correlation mentioned in steps (2) and (3) above (refer to steps (1) through (6) in conventional OCR. The central processing unit ("CPU") of the image processor is used for computational intensive operations such as the analysis of the recognized characters from the vector correlation data mentioned in step 4 above; of the conventional character recognition tasks. All these tasks can be overlapped with each other for the rotation invariant, position invariant and, the rotation and position invariant character recognition methods to achieve very high recognition speed. This method of overlapping multiple processes is called "concurrency". By overlapping these different tasks performance is not sacrificed while achieving high speed. This method maximizes the computational ability of the image processing machine. In accordance with this invention rotation and position invariant OCR technology are divided into different tasks, the processors performing these tasks are identified, the processing of these tasks are overlapped in appropriate order, intermediate data is stored and, then correct final results are achieved.

BRIEF DESCRIPTION OF THE DRAWINGS

The various advantages of the present invention will become apparent to one skilled in the art by reading the following specification and drawings which form an integral part of the description of the preferred embodiments and are to be read in conjunction therewith. Identical reference numerals designate like components in the different figures, where:

FIGS. 9A and 9B are a flow chart showing rotation invariant character recognition under "concurrency" with intermediate buffer names;

FIGS. 11A and 11B are a flow chart showing position independent character recognition process under "concurrency" with intermediate buffer names.

FIGS. 13A and 13B are a flow chart showing a rotation and position independent character recognition process under "concurrency" with intermediate buffer names.

DETAILED DESCRIPTION OF THE PREFERRED EMBODIMENT

Figure 1:
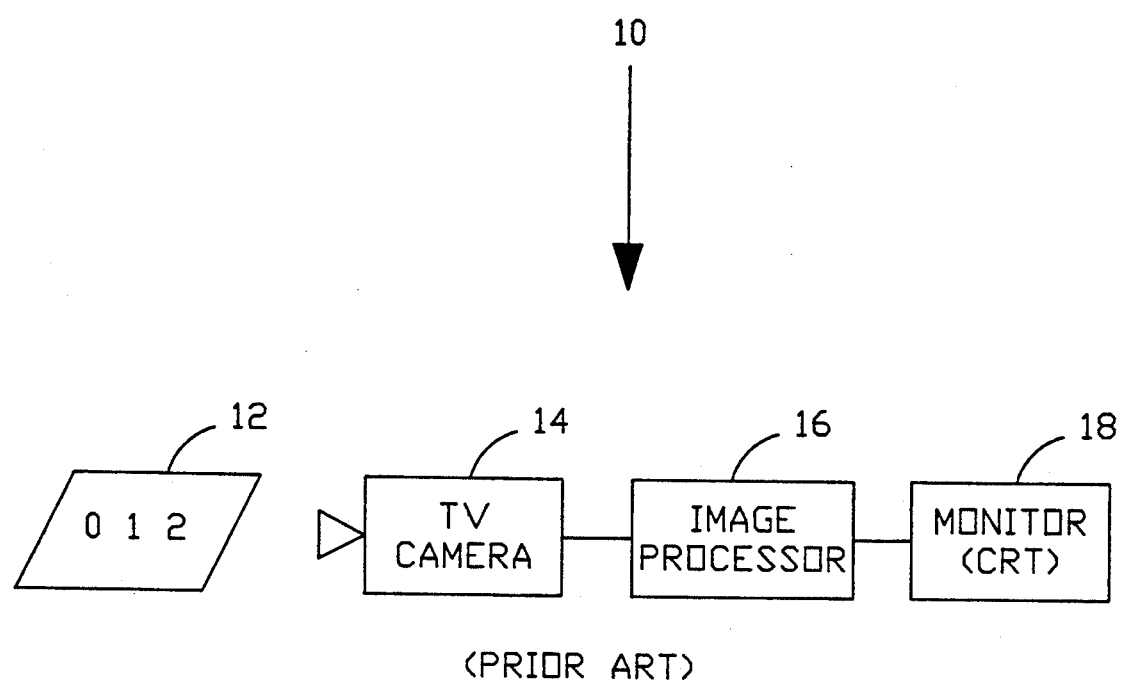
FIG. 1 is a block diagram of the embodiment of a conventional character recognition system.

Referring now to FIG. 1, there is shown a block diagram of a conventional character recognition system 10 in accordance with the prior art. A character set 12 consisting of the numbers "012" is sensed by a TV camera 14. An image processor 16 performs image analysis on the image signal from the TV camera 14 and displays the processed image on a monitor 18.

Figure 2:
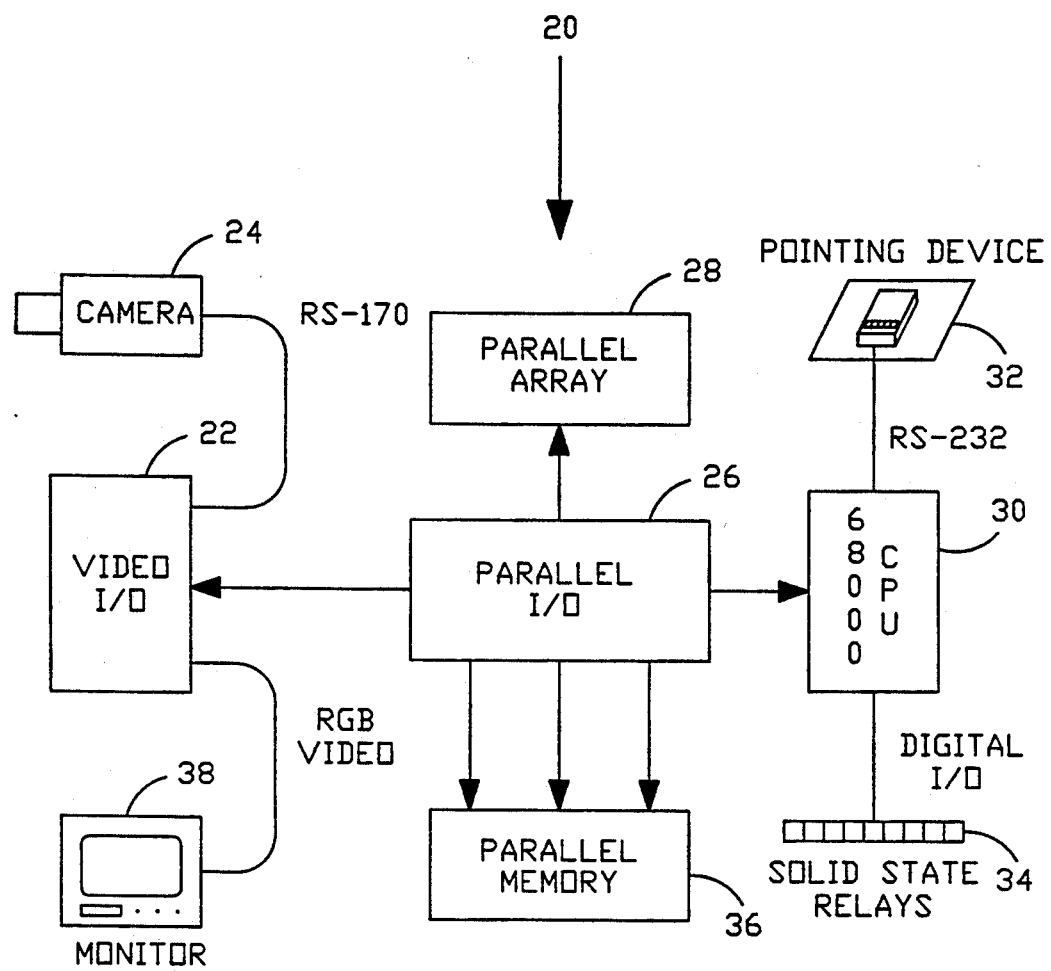
FIG. 2 is a block diagram of a preferred embodiment of the machine vision system hardware used in FIG. 1.

FIG. 2 is a block diagram of a preferred embodiment of the hardware for vision system 20. The system 20 comprises a vision system available from Applied Intelligent Systems Inc. ("AISI") of Ann Arbor, Mich. In the preferred embodiment, this system 20 is a stand alone gray scale and binary image analysis system available form AISI as model 4000. Other suitable AISI systems include the models 3000, 3500 and 5000.

This AISI image processor 20 belongs to the category of massively parallel, single instruction multiple data ("SIMD"), single bit, mesh connected processor. It is general purpose because each individual processing element is a programmable bit-serial processor with its own memory. It is massively parallel because the system 20 system can contain up to 1024 of these general purpose bit-serial processor, which are tightly coupled to each other and which operate in lock step as a one-dimensional SIMD array computer. Also, there are no chips or circuits within the AISI system 20 to perform specific functions. Instead, the general purpose parallel processor, which is programmed using AISI's "LAYERS" software environment, performs such operations as convolutions, filtering, morphology, feature extraction, and many others. These computers can be used in conjunction with a graphic workstation or a stand-alone unit.

The vision system 20 consists of the following five main components:
(1) video input/output section ("I/O") 22 coupled to a camera 24,
(2) special-purpose, high speed parallel memory input/output unit 26,
(3) SIMD array parallel processor array unit 28 with controller for the parallel processors,
(4) general purpose CPU 30 consisting of a Motorola 68000 host processor and peripherals 32, 34 and
(5) parallel, image processing memory 36.

The five major sub-systems of the AISI vision computers operate together to perform all types of vision processing operations. In general, the operation of the entire system is as follows:

(1) Video signals from the camera 24 come into the video I/O section where they are digitized and the resultant bytes are sent to the parallel memory I/O section 26. The image processor 20 is capable of supporting different resolutions of image. The model 5000 generally comes with 384 by 256 pixels image resolution, but can easily be upgraded to 512 by 256 pixels image resolution. Alternatively, there is 384 by 256 pixels image resolution in the model 3000 computers, and there is 512 by 256 or 512 by 512 pixels resolution in models 3500 and 4000.

(2) The parallel memory I/O section 26 accumulates a raster scan line and, when complete, stores this line into the parallel memory 36. The I/O part of the computer also gets data in and out of the parallel processing memory 36. The parallel memory I/O section 26 can read an image out of parallel memory, one scan line at a time, and send it to the Video I/O section 22 which will display it on a monitor (CRT) 38. This displayed image can be the original input image or any of the processed results in the parallel memory.

(3) The parallel processor array 28 of this system 20 consists of a large number of processing elements and the controller which directs their operation. The parallel array operates on the image stored in parallel memory. The results of the image operations are stored back into parallel memory by the parallel array 28.

(4) The host CPU 30 (Motorola 68000) reads the results of the parallel array computations stored in parallel memory 36. These results can be processed further by the CPU 30, if necessary. The CPU 30 can communicate results of commands through its external interfaces if necessary.

(5) The parallel processor memory 36 is associated to the parallel processor array 28. This memory is used to store the initial image and any image processed by the parallel processors. There is up to 4 Mega bytes of parallel processor memory or image memory available in model 5000.

Many of the above-mentioned operations can take place at the same time. All of the major subsystems operate independently so that, for example, a video image can be input into parallel memory 36, while the parallel processor 28 is processing previously acquired image, while the CPU 30 is communicating with another device, while an image is being displayed in the monitor 38. This simultaneous processing capability of the machine has been extensively used in our character recognition system of the present invention. The computational implementation of this capability is referred to as "concurrency".

It should be noted that the parallel processor controller within the parallel processor unit 28 instructs the processing elements to perform their operations. The controller is, therefore, intimately tied to the operation of the parallel processor in its execution of vision operations. It is also, however, a distinct and separate processor in its own right. It runs programs written in microcode and can perform logical and arithmetic functions. Although its main function is to drive the parallel processor, it can also be programmed to perform other operations when it is not busy feeding instructions to the parallel processor.

Many different software functions may be added to the image processing machine 20 to do various arithmetic, gray scale and binary image processing operations. All these operations take advantage of the massively parallel architecture of the machine. The specifics of the operation of the vision system 20 hardware, system software and image analysis function library is well documented in existing AISI system, hardware and software manuals and literature, including the following, which are hereby incorporated by reference:

(1) The AIS-5000 Parallel Processor, (1988) IEEE Transactions on Pattern Analysis and Machine Intelligence Vol. 10, No. 3 pages 320-330 May 1988;
(2) AISI Hardware Installation and Reference Manual (1989);
(3) AISI Software Technical Overview (1989);

Out of the many binary and arithmetic software functions available in the hardware, the one of particular importance to the present invention is called "vector correlation". This function has been discussed in general in the publication referred to in item (1) above. This operation takes maximum advantage of the processor/memory architecture. In brief, this operation can be described as a two-dimensional correlation operation. Given a template for a character and a character image, the template can be correlated to the character image and a correlation image can be obtained. The correlation image contains a residue wherever the template fully correlated with the character image. This process can be done very fast in this massively parallel architecture of the AISI image processor. This operation forms an integral part of our character recognition process.

In light of the references mentioned above, further description of the general AISI vision systems, such as system 20, need not be given here. Moreover, those skilled in the art of machine vision systems will be well aware of how to program and how to use most image processes or analysis functions available in a vision system library. Therefore, a detailed explanation of applications programming and machine vision image processing functions need not be given herein.

B. CHARACTER RECOGNITION METHOD

Figure 3:
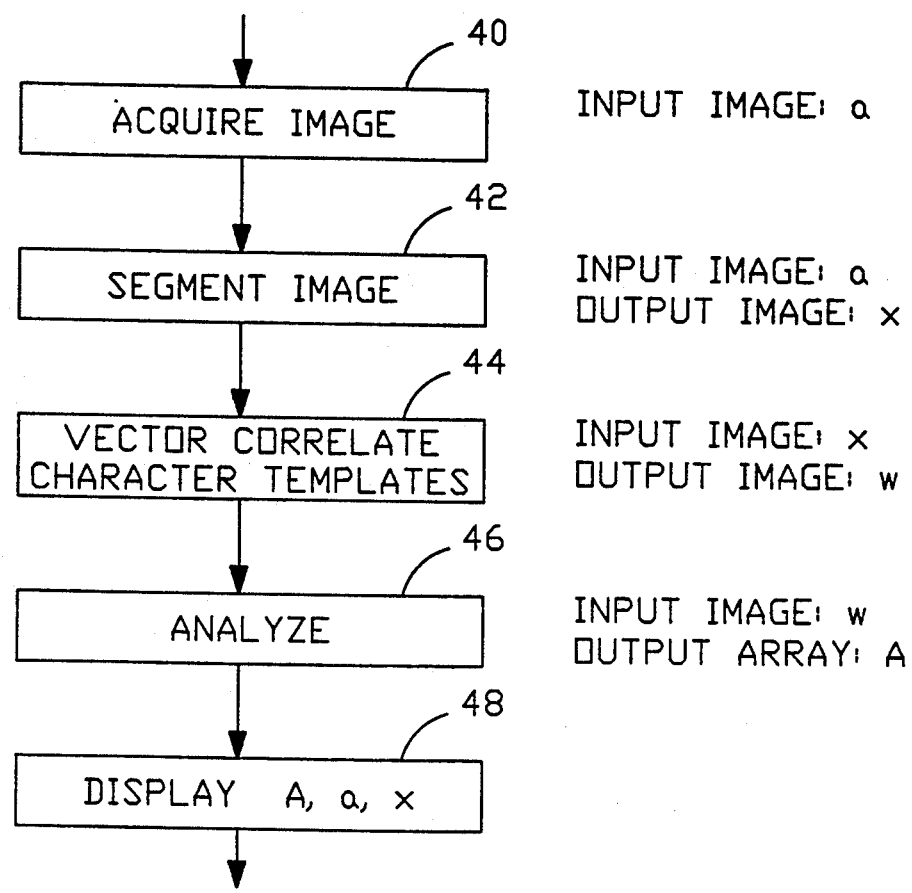
FIG. 3 is a flow chart showing the conventional character recognition process with intermediate buffer names.

The conventional character recognition method implemented in the AISI image processors consists of several distinct steps outlined in FIG. 3. The character recognition algorithm runs in the image processor and controls the camera, monitor and all other peripheral devices. The steps in the character recognition method includes:

(1) image acquisition with a camera 40;
(2) image segmentation in the parallel processor memory
(3) vector correlation of the image in parallel processor memory 44:
(4) analysis of the vector correlated data to distinguish the recognized characters 46;
(5) display of the recognized characters and their images 48.

The image acquisition step 40 consists of the CPU 30 of the image processor 20 asking the camera 24 to take a picture. The analog image data is then processed by the digitized in the video I/O 22 to create the digitized image data. Different resolutions of the image are produced based on the type of the hardware and the their configuration. Image resolutions possible are 384 by 256 or 512 by 256 or 512 by 512 pixels. The digitized image resides in the parallel processor image memory 36.

The digitized image data is then processed by the parallel processor 28 to create a segmented image of the characters. For this step of image processing, many of the AISI software functions such as the gray scale and binary functions are executed in appropriate order in order to bring out the character image from the rest of the image. One of the functions frequently implemented for image segmentation is called "gray scale image normalization". This functions normalizes the gray scale image obtained by the image acquisition process and compensates for background lighting. This image is then "thresholded" to create a binary image of the characters. The binary image contains the image of the characters with possible noise. The binary image is then filtered by binary image processing functions, available in the AISI computers, to extract a cleaner image of the characters. This process of extracting and cleaning the character image is being referred to as "image segmentation" for in step (2) of the conventional character recognition process. This step 42 of image processing is done by the parallel processors in the parallel array 28 with memory 36 of the image processor 20.

Figure 5:
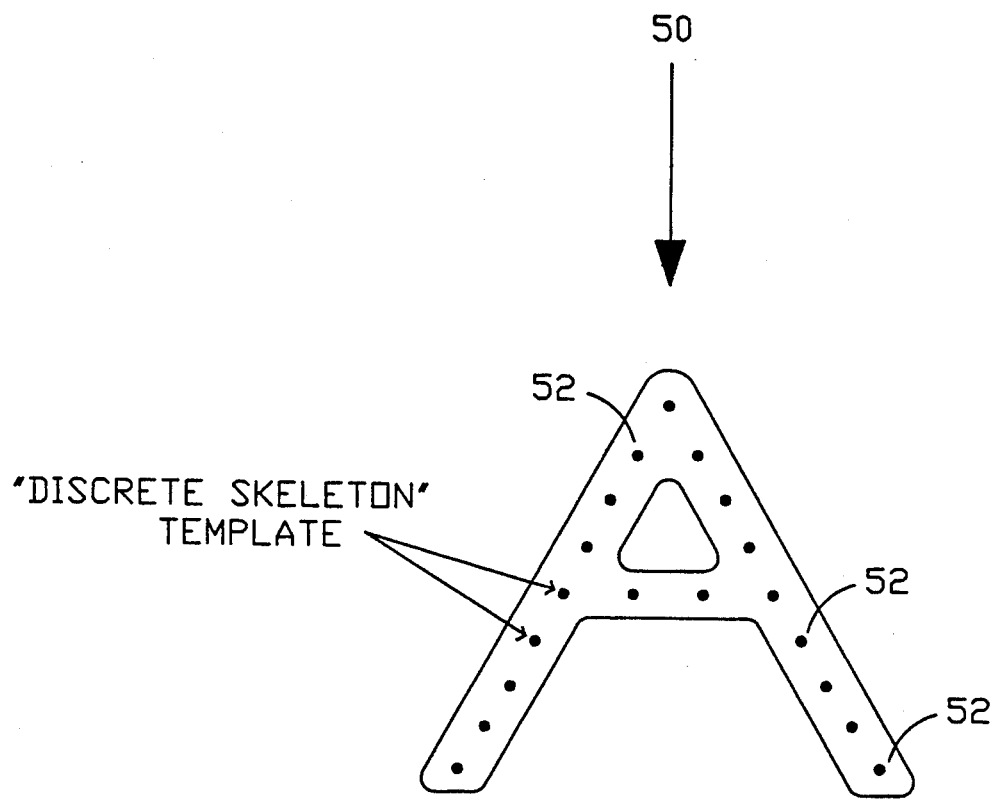
FIG. 5 is an explanatory view of a "discrete skeleton" template of a character.

The vector correlation step 44 is also an image processing step executed on the binary character image obtained after step (2), 42. Here the template of the characters are first obtained in the teach phase of the character recognition task. Referring to FIG. 5, a template of a character is a "discrete skeleton" 50 of the individual character to be recognized. The "discrete skeleton" 50 is obtained by first placing a set of dots 52 towards the center of the character image shown in FIG. 5. The vector correlation step correlates these dots representing a character to the entire image. If the dots correlate to a character image, then a residue is obtained in the correlation image. A residue is defined as a collection of pixels at a given location within the character where the "discrete skeleton" template of the character correlates with the character image. If the dots do not belong to the character image, then they do not correlate with it and no residue is obtained in the correlation image. The vector correlation step 44 utilizes the power of the parallel architecture of the AISI image processors and accomplishes the correlation tasks at high speed. This process is also done by the parallel processors in the parallel array 28 using parallel processing memory 36.

The analysis step 46 is performed on the correlated image obtained in the vector correlation step 44 (3). The correlated data is analyzed by the CPU 30 to extract the recognized characters. This step is performed by the CPU 30 using CPU memory. The final results are then displayed (step 48) on the monitor 38.

The conventional character recognition task done by the five steps mentioned above can be executed sequentially. In this process the total time taken to perform one character recognition task is a sum of the times taken by each one of the five steps. Even though the speed of the recognition process achieved by sequential execution is good for many applications, some other applications demand higher speed and performance criteria. An improved method of character recognition can be achieved by overlapping some or all of the steps mentioned above. In summary, the conventional character recognition consists of five steps which are performed by three separate processing units. The image acquisition step 40 is performed by the camera 24. Steps 42 and 44, consisting of image segmentation and vector correlation, are performed by the parallel processor 28. The analysis step 46 is performed by the CPU 30 and, the display step (5) is performed by the monitor 38.

In accordance with the present invention, a method of overlapping the tasks performed by the camera 24, parallel processor 28 and the CPU 30 will be disclosed. This will overlap the acquisition task in step 40, with the parallel processor tasks (segmentation and vector correlation) in steps 42 and 44, with the CPU task (analysis) in step 46. In this model of character recognition the speed of the OCR task is not determined by the sum of the times taken by all the 5 steps, but by the maximum time taken by any one of the five steps. Here all the processors are processing simultaneously. This process of overlapping the processing power of each processor is called "concurrently". This yields a faster processing capability and many more parts can be processed without losing performance.

The model of the conventional character recognition process shown in FIG. 3 also includes the buffer names for intermediate images. In this, we first take a picture of the characters in an image buffer marked "a" located in parallel memory 36. The image in buffer "a" is then segmented by step 42 to extract a cleaner character image in buffer "x". The character image in buffer "x" is then vector correlated with the character templates ("discrete skeletons") to create a correlated image in buffer "w". The correlated image in buffer "w" is then processed to extract the characters recognized in an array "A". The array "A" now contains the final results of the recognition task. In order to overlap the different tasks we have to store the intermediate results so that they can be accessed by the subsequent processing units without disturbing the current results.

Figure 4:
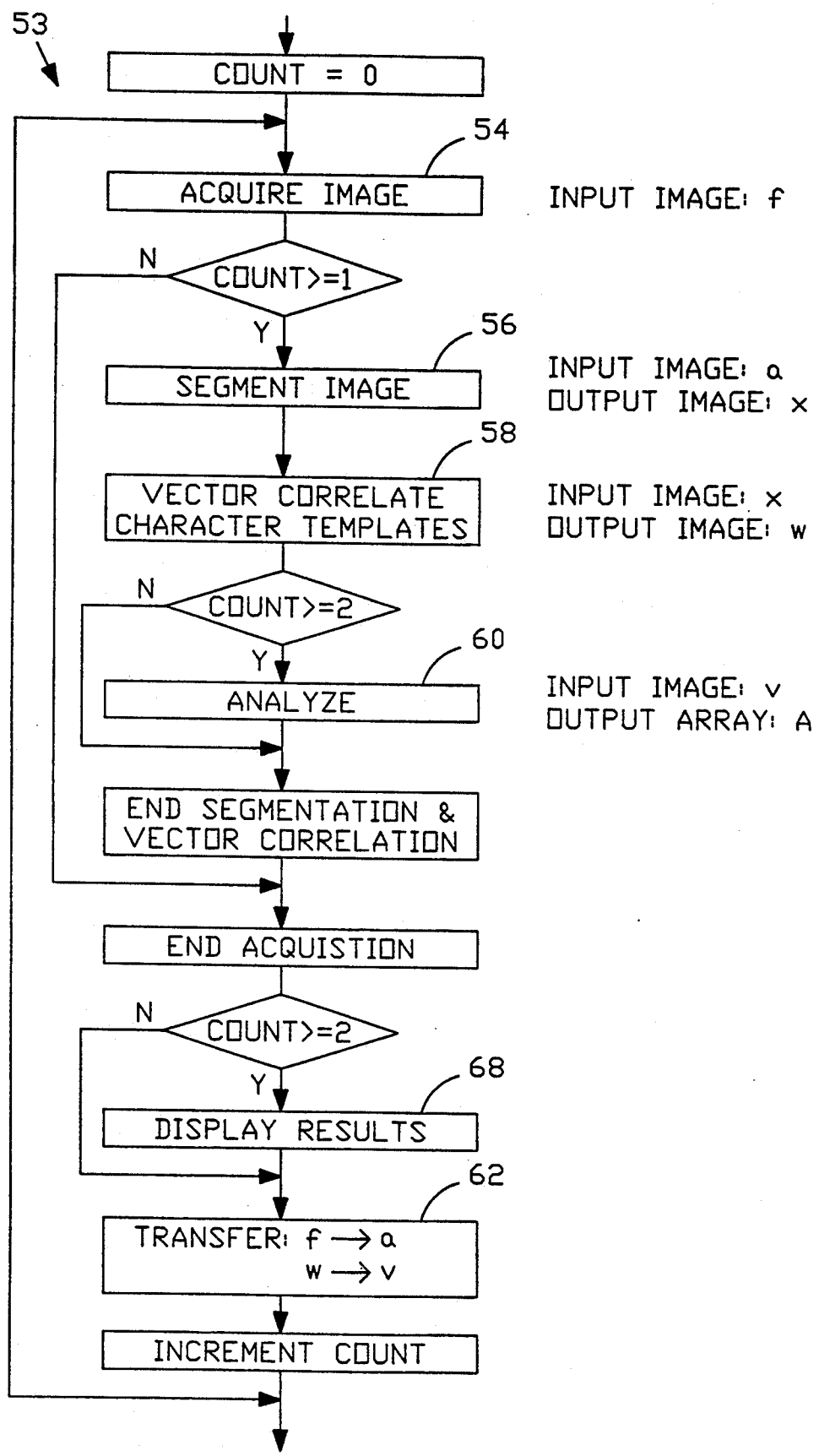
FIG. 4 is a flow chart showing the conventional character recognition process under "concurrency" with intermediate buffer names.

FIG. 4 shows a flow chart 53 of the conventional character recognition task with the buffer names for intermediate images adapted to operate with "concurrency". Here the camera takes a picture of the characters in a buffer named "f" in step 54. The segmentation step 56 starts only after the first image is taken. The segmentation step 56 takes the character image in buffer "a" and extracts a cleaner character image into buffer "x". The image in buffer "x" is vector correlated with the character templates to create a correlation image in buffer "w" in step 58. The segmentation and correlation steps occur in the parallel processor memory 36 and are done by the parallel processor array 28. These 2 steps can continue while the camera takes a picture in buffer "f". Also at the same time the analysis step 60 done by CPU 30 can continue. The CPU 30 takes the data from a buffer "v" and extracts the characters recognized into an array "A". The analysis step 60 and display step 68 do not begin till two images are acquired. At the end of these steps the data from buffer "f" is transferred to buffer "a", and the results of buffer "w" are transferred to buffer "v" in step 62. This way each processing unit can process from an input buffer and output it to an output buffer without disturbing the contents and results of any other processing units.

Figure 6:
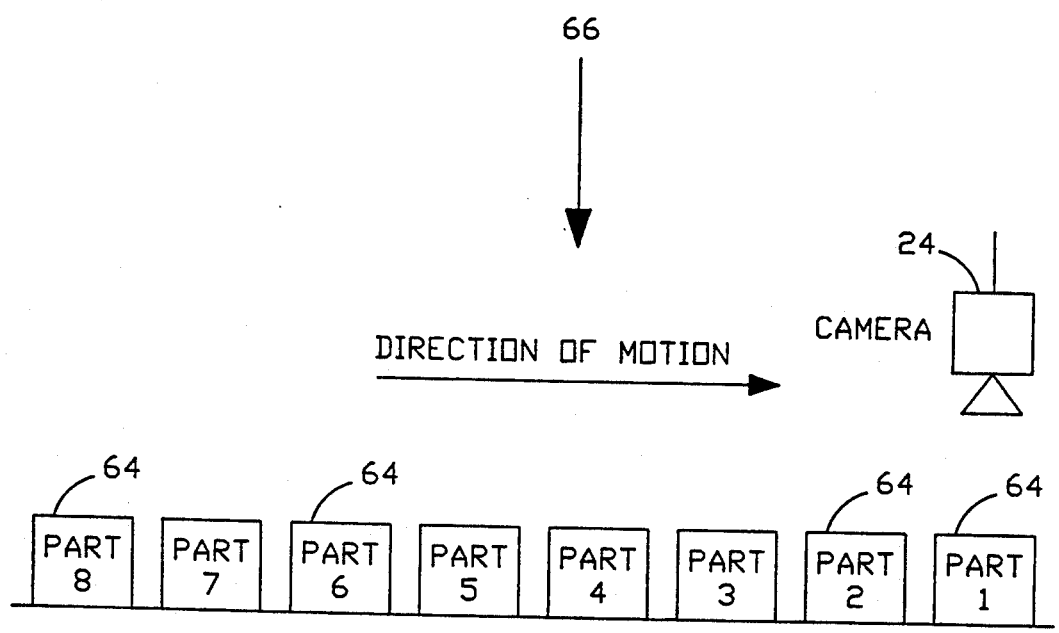
FIG. 6 is an explanatory view of a manufacturing line with eight parts on it moving from left to right.

The "count" variable shown in FIG. 4 and subsequently FIGS. 9, 11 and 13, represent a counter that counts the parts going through a certain point in the manufacturing line. FIG. 6 shows an example of a manufacturing lien with eight parts on it. The entire character recognition process starts with the "count" variable set to a value of "0", as shown in the flow chart in FIG. 4. As part 1 arrives under the camera, a triggering device, such as a photoswitch triggers the image processor to start taking a picture of part 1 with the camera 24. When part 1 has been completely processed, the "count" variable is incremented to a value "1". Next, the image processor waits for part 2 to trigger the photoswitch which in turn triggers the character recognition process. At the end of each OCR task the "count" variable is incremented. Thus, the "count" variable is used to check how many parts have been processed for OCR at any given time. In the "concurrency" model each processor is processing a task that has been handed down to it by another processor in a previous OCR cycle. For example, the parallel processor 28 cannot begin processing an image till the camera 24 has already acquired an image of the previous part in the previous OCR cycle. Similarly the CPU 30 cannot perform the analysis step till the parallel processor 28 has already processed the image of the previous part. Thus, the "count" variable serves as an effective way of separating the data from different parts, as the individual processors continue processing them "concurrently".

The above-mentioned steps of concurrent processing can be better explained by an example of moving parts in a manufacturing line. FIG. 6 shows a camera taking pictures of parts 64 moving down a manufacturing line 66. When part 1 comes under the camera, a triggering device, such as a photoswitch, (not shown) signals the image processor 20 to acquire a picture of the part. The image processor then starts acquiring the picture of part 1 in buffer "f". Once this picture taking process is done the image processor waits for the next part. The picture data of part 1 is now transferred from buffer "f" to buffer "a". Next the photoswitch triggers the image processor to take the picture of part 2. Now the camera starts taking the picture of part 2 in buffer "f". While the camera is doing its job, the picture of the part 1 in buffer "a" is segmented by the parallel processor to extract the character image in buffer "x" in step 56. Next the results of buffer "x" is vector correlated to get the correlated image in buffer "w" in step 58. Once the parallel processor tasks (segmentation and vector correlation) are done and the camera task is done the data is transferred. The correlated image of part 1 in buffer "w" is transferred to buffer "v" and the raw camera image of part 2 in buffer "f" is transferred to buffer "a" in step 62. Next the image processor waits for part 3 to trigger the photoswitch. Once the photoswitch triggers the image processor, the camera starts taking the picture of part 3 in buffer "f" in step 54. While the camera takes the picture of part 3, the parallel processor starts processing the image in buffer "a" of part 2 and outputs the cleaner character image in buffer "x" in step 56. The parallel processor then continues with the vector correlation step 58 to process the image in buffer "x" to output a correlated image in buffer "w". While the camera takes the picture of part 3 and the parallel processor processes the image of part 2, the CPU picks up the vector correlated results of part 1 in buffer "v" to output the recognized characters in array "A" in step 60. At the end of the camera, parallel processor and the CPU tasks, the intermediate data is transferred in step 62. The picture of part 3 taken in buffer "f" is transferred to buffer "a". The segmented and vector correlated result of part 2 in buffer "w" is transferred to buffer "v", and the recognized characters of part 1 in array "A" are displayed in step 68. These steps then continue for all future parts coming down the manufacturing line.

The overlapped processing described above utilizes the maximum processing power of the image processor 20, and increases the processing rate of character recognition considerably. This idea of "concurrency" has also been extended and utilized in the rotation and position invariant character recognition methods as described below. It is somewhat more complex in these cases because of the complexity and the order of the processing steps involved.

C. ROTATION INVARIANT METHOD

Figure 8:
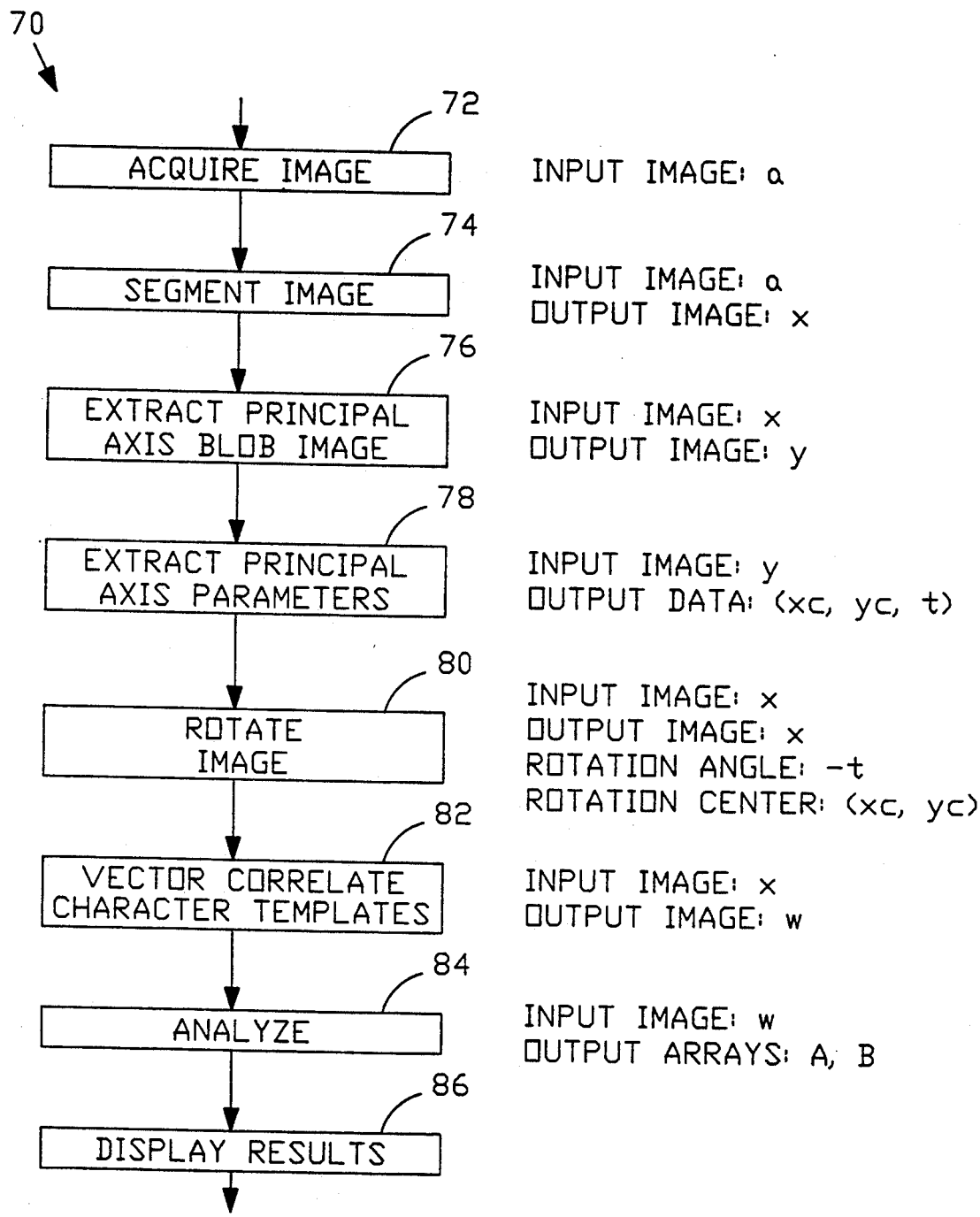
FIG. 8 is a flow chart showing rotation invariant character recognition with intermediate buffer names.

FIG. 8 illustrates a flow chart for the rotation invariant character recognition method 70 with intermediate buffer names. This algorithm has three new steps over and above the steps involved in conventional character recognition shown in FIG. 3. The rotation invariant character recognition consists of the following eight steps:

(1) acquire an image with the camera 72;
(2) segment the image with the parallel processor 74;
(3) extract a blob for principal axis computation with the parallel processor 76;
(4) extract principal axis parameters from the blob using the CPU 78;
(5) rotate the character image 80;
(6) vector correlate the character templates in right-side-up and up-side down positions 82;
(7) analyze the correlation image using the CPU 84;
(8) display the results in the monitor 86.

Here we have all the steps of the conventional character recognition with three new steps for rotation independence. These steps (3), (4) and (5) rotate the character image to its "nominal" position. The "nominal" position is the horizontal position of the character string. As explained later, the "nominal" position can either be the right side up or up side down position of the characters. The vector correlation step has also been modified. Here two sets of vector correlations are done —one with the character templates in right side up position and, one with the character templates in up side down positions. The analyze step 84 has also been modified to process two correlation images instead of one.

The first step 72 in rotation invariant OCR consists of acquiring an image of the characters. This process is done by the camera unit 24. The acquired image is stored in an image buffer called "a". The acquired image is then processed by the parallel processor 28 to segment the characters out of the raw camera image. Here the image processing functions available in the AISI image processor are utilized in a given sequence to extract a cleaner image of the characters. Examples of such functions are provided in the conventional character recognition section (Section B). This step is performed by the parallel processor 28 with parallel processing memory 36.

The next new step is principal axis image extraction 76. In this step, a blob is extracted from the original image "a" or the processed image "x", in order to extract the principal axis parameters described below. Here we also use the image processing functions available in the AISI image processor 20. This image processing step 76 extracts a blob representing the orientation of the characters in the image. The blob is stored in an image buffer "y". Next is the step of principal axis parameter extraction 78. Here the blob image in buffer "y" is processed to extract a principal axis. The principal axis is extracted by computing the eigenvalues and eigenvectors of the blob image. The eigenvector corresponding to the largest eigenvalue is the principal axis direction of the blob. If Xi and Yi are the x- and y-coordinates of the pixels belonging to the principal axis blob image and, there are N such pixels, then the first order moments "(xc, yc)" of the blob image are computed by the following equations:

$$xc = (1/N) \sum_{i=1}^{N} X_i \quad (1)$$

$$yc = (1/N) \sum_{i=1}^{N} Y_i \quad (2)$$

The 2 by 2 covariance matrix of the blob is:

$$\begin{bmatrix} k1 & k2 \\ k2 & k3 \end{bmatrix} \quad (3)$$

where
$$k1 = 1/(N-1) \sum_{i=1}^{N} (X_i - X_c)^2$$

$$k2 = 1/(N-1) \sum_{i=1}^{N} (X_i - X_c)(Y_i - Y_c)$$

$$k3 = 1/(N-1) \sum_{i=1}^{N} (Y_i - Y_c)^2$$

The largest eigenvalue ("Lmax") computed from the matrix in equation (3) above is:

$$L_{max} = \frac{k_1 + k_3 + \sqrt{(k_1 - k_3)^2 + 4k_2^2}}{2} \quad (4)$$

The principal axis orientation angle "t" is given by:

$$\tan 2t = \frac{k_1 - k_3}{2k_2} \quad (5)$$

where k1, k2 and k3 are shown above.

It can be seen from equations (1) and (2) above, that "xc" and "yc" constitute the centroid of the principal axis blob image. In steps above, we computed the centroid of the blob "(xc, yc)" and the orientation angle "t" of the principal axis blob image in buffer "y". It can be easily seen from equation (5) above that the principal axis angle "t" of the blob is the smallest angle of the blob from horizontal. Thus, for two images 88, 90 shown in FIG. 7, the characters "1 2 3" written within the blob are oriented at angles "t" or "−t" from the horizontal respectively.

Figure 7:
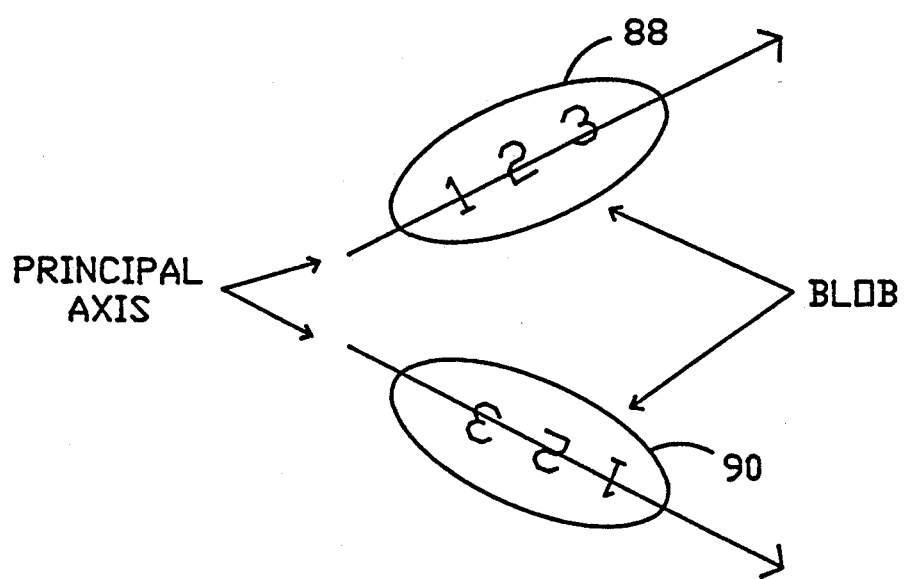
FIG. 7 is an explanatory view showing a character image in two orientations.

After the computation of the principal axis parameters "(xc,yc,t)", is the step of image rotation 80. Here we rotate the processed image in buffer "x" by the smallest angle possible to the horizontal. The rotation is done about the centroid (xc, yc) of the blob image. Thus we rotate the two images in FIG. 7 by angles −t and t respectively. It can be easily seen from FIG. 7, that because of these two rotations, the character string "1 2 3" in the first image of FIG. 7 88 is positioned right side up, whereas, the character string "1 2 3" in the second image 90 is positioned up side down. This step is performed by the parallel processor 28 with the parallel processor memory 36. After rotating image "x" by the parameters (xc, yc, t) the final rotated image is also placed in image buffer "x".

The next step after rotation of the processed image is vector correlation 82. As mentioned above, the rotation step can place the characters in buffer "x" either right side up or up side down. The vector correlation step 82 now has to correlate the templates of the taught characters in both the orientations—right side up or up side down. The two orientations of the templates are correlated to create two correlation images in buffer "w". The vector correlation step is also performed by the parallel processor in the parallel processing memory.

The analysis step 84 in the rotation invariant OCR processor 70 is more complicated than the corresponding step in conventional OCR. Here the two correlated images "w" generated by the vector correlation step 82 are analyzed to create two sets of character strings "A" and "B". The character array "A" contains the characters recognized by correlating the templates of the taught characters in the right side up positions and, array "B" contains the characters recognized by correlating the character templates in up side down positions. Both arrays "A" and "B" along with images "a", "x" and "y" are displayed. The correct set of recognized characters from arrays "A" and "B" is determined by a preset criteria. One such criteria can be a defined string of characters that we are trying to recognize. We then match arrays "A" and "B" to this pre-defined character string that we are looking for. The closest match among arrays "A" or "B" is considered as the correct set of recognized characters. All these steps in analysis are done in the CPU 30 with CPU memory.

D. CONCURRENCY IN ROTATION INVARIANT OCR

FIG. 9 illustrates a flow chart for rotation invariant character recognition with intermediate buffer names under "concurrency". The "concurrency" model for rotation invariant OCR is much more complex than conventional OCR because of the number of steps involved in the recognition task (8 steps instead of 5 in the conventional OCR method). Also here, different steps are processed by the different processing units but they are not arranged in such an order that they can be easily performed one after another as in the conventional OCR algorithm shown in FIG. 3. In the conventional OCR algorithm the first 4 steps can be easily divided into 3 groups—step (1) is performed by the camera, steps (2) and (3) are performed by the parallel processor and step (4) is performed by the CPU. In the case of rotation invariant OCR the steps cannot be divided into clean groups like that. In this case step (1), i.e. acquisition is performed by the camera, step (2) or segmentation is performed by the parallel processor, step (3) or principal axis blob extraction is performed by the parallel processor, step (4) or principal axis data extraction is performed by the CPU, step (5) or image rotation is performed by the parallel processor, step (6) or vector correlation is performed by the parallel processor, step (7) or analysis is performed by the CPU and, step (8) or display is performed by the monitor. For a single image, the steps have to be performed in a sequence from step (1) to step (8). Because some of these steps are performed by the parallel processor and some by the CPU, the order of processing is mixed up between the different processors and we have to separate out the processing tasks and rearrange the processing order.

We shall first group the tasks by the processors that execute them. The camera 24 performs the following task:

(1) image acquisition 94.

The parallel processor 28 performs the following tasks:
(1) image segmentation 96,
(2) principal axis blob image extraction 98,
(3) image rotation 100,
(4) vector correlation with character templates 102.

The CPU 30 performs the following tasks:
(1) principal axis data extraction 104,
(2) analysis of correlation data 106.

The Display Monitor 38 performs the following task:
(1) display the results 108. If we group the tasks under three different groups as mentioned above, then we have to arrange the intermediate data transfers in such a way that the appropriate task gets the data in the correct sequence. For this we have constructed the flow chart 92 shown in FIG. 9.

The rotation invariant algorithm under "concurrency" in FIG. 9 can be better illustrated with the example of parts in a moving line shown in FIG. 6. As part 1 comes under the camera, the photoswitch triggers the AISI image processor 20 to take a picture of this part. The camera 24 then starts taking a picture of part 1 under the camera into an image buffer "f". When the camera completes this picture taking process, the image processor transfers the image of part 1 in buffer "f" to buffer "a" and, waits for the next part to come under the camera.

When the photoswitch triggers the camera for part 2, the camera starts taking a picture of part 2 in buffer "f". While this picture is being taken, the parallel processor starts segmenting the image of part 1 in buffer "a" into an image buffer "x1". The parallel processor 28 then processes the image in buffer "x1" to extract a blob for principal axis computation into buffer "y1". At the end of the camera and image processor tasks, the image of part 2 in buffer "f" is transferred to buffer "a" and the character image of part 1 in buffer "x1" is transferred o buffer "x4" and, the blob image of part 1 in buffer "y1" is transferred to buffer "y2".

Next, when part 3 triggers the photoswitch, the camera 4 starts taking a picture of part 3 in buffer "f". While the camera takes a picture of part 3, the parallel processor segments the image of part 2 in buffer "a" to extract a cleaner character image in buffer "x1" and, then the parallel processor extracts a blob for principal axis computation in buffer "y1". Simultaneous to these two tasks, the CPU extracts the principal axis parameters of part 1 from an image stored in buffer "y2". The parameters computed are "xc1" and "yc1" for x and y centroids of the principal axis blob, and "t1" for the smallest rotation angle. These parameters (xc1,yc1,t1) are stored in CPU memory. At the end of the parallel processor, camera and CPU tasks, image "f" of part 3 is transferred to buffer "a" (step 109). Also the segmented character image of part 1 in buffer "x4" is transferred to buffer "x3", and the segmented character image of part 2 in buffer "x1" is transferred to buffer "x4". The extracted blob image of part 2 in buffer "y1" is transferred to buffer "y2" and, the principal axis parameters of part 1 in variables (xc1, yc1, t1) are transferred to variables (xc2, yc2, t2) in CPU memory.

Next, part 4 comes under the camera and the photoswitch triggers the camera 24 to start taking a picture of part 4 in buffer "f". Simultaneously, the parallel processor 28 segments the image of part 3 in buffer "a" to extract a cleaner character image in buffer "x1" and then extracts the principal axis blob from buffer "x1" into buffer "y1". At the same time, the CPU 30 extracts the principal axis parameters (xc1, yc1, t1) of part 2 in buffer "y2". The parallel processor 28, at the same time, rotates the image of part 1 in buffer "x3" by the parameters (xc2, yc2, −t2). At the end of all these tasks the following transfers take place. The image of part 4 in buffer "f" is transferred to buffer "a". The correlated image of part 1 in buffer "x3" is transferred to buffer "x2". The character image of part 2 in buffer "x4" is transferred to buffer "x3". The character image of part 3 in buffer "x1" is transferred to buffer "x4". The principal axis parameters (xc1, yc1, t1) of part 2 are transferred to (xc2, yc2, t2) and the blob image of part 3 in "y1" is transferred to buffer "y2".

When part 5 comes by, the photoswitch triggers the camera 24 to take a picture of part 5 in buffer "f". Simultaneously, the image of part 4 in buffer "a" is segmented into buffer "x1" and then the principal axis blob for this image is extracted into buffer "y1". The CPU simultaneously processes the blob image of part 3 in buffer "y2" to extract the principal axis parameters (xc1,yc1,t1). The parallel processor, at the same time, rotates the image of part 2 in buffer "x3" by the parameters (xc2,yc2,−t2). The image of part 1 in buffer "x2" is vector correlated to the character templates, to create a correlated image in buffer "w". When all these tasks are completed, the following data are transferred. The image of part 5 in buffer "f" is transferred to buffer "a". The rotated image of part 2 in buffer "x3" is transferred to buffer "x2". The segmented image of part 3 in buffer "x4" is transferred to buffer "x3" and the segmented image of part 2 in buffer "x1" is transferred to buffer "x4". The principal axis parameters (xc1,yc1,t1) of part 3 are transferred to (xc2,yc2,t2). The blob image of part 4 in "y1" is transferred to buffer "y2". Also the correlated character image in buffer "w" is transferred to buffer "v".

Finally part 6 arrives under the camera 24 and, the camera starts taking a picture of part 6 in buffer "f". Simultaneously, the parallel processor 28 starts segmenting the character image of part 5 in buffer "a" into buffer "x1". It then extracts the principal axis blob of part 5 into buffer "y1". At the same time, the CPU 30 extracts the principal axis parameters 28 (xc1, yc1, t1) of part 4 from image "y2". The parallel processor 28, simultaneously, rotates the image of part 3 in buffer "x3" by parameters (xc2,yc2,−t2). Also the parallel processor does the vector correlation on rotated character image of part 2 in buffer "x2" to extract the correlation image of part 2 into buffer "w". The CPU also performs the analysis task, simultaneously, on the correlation image "v" of part 1 to create the recognized character arrays "A" and "B". The two arrays correspond to the right side up and up side down correlation results mentioned before. When all these tasks are done, the intermediate data are transferred and the results are displayed in step 108.

It is clear from the above explanation and FIG. 9 that the "concurrency" for the rotation invariant OCR is more complex and utilizes the processing capability of the AISI image processors to their maximum capability. However, the "concurrency"]model adopted her does not interfere with intermediate processing tasks and accomplishes the same final results without wasting any processing power of the image processing machine. This gives us a very fast OCR technology that is also rotation invariant.

E. POSITION INVARIANT CHARACTER RECOGNITION

Figure 10:
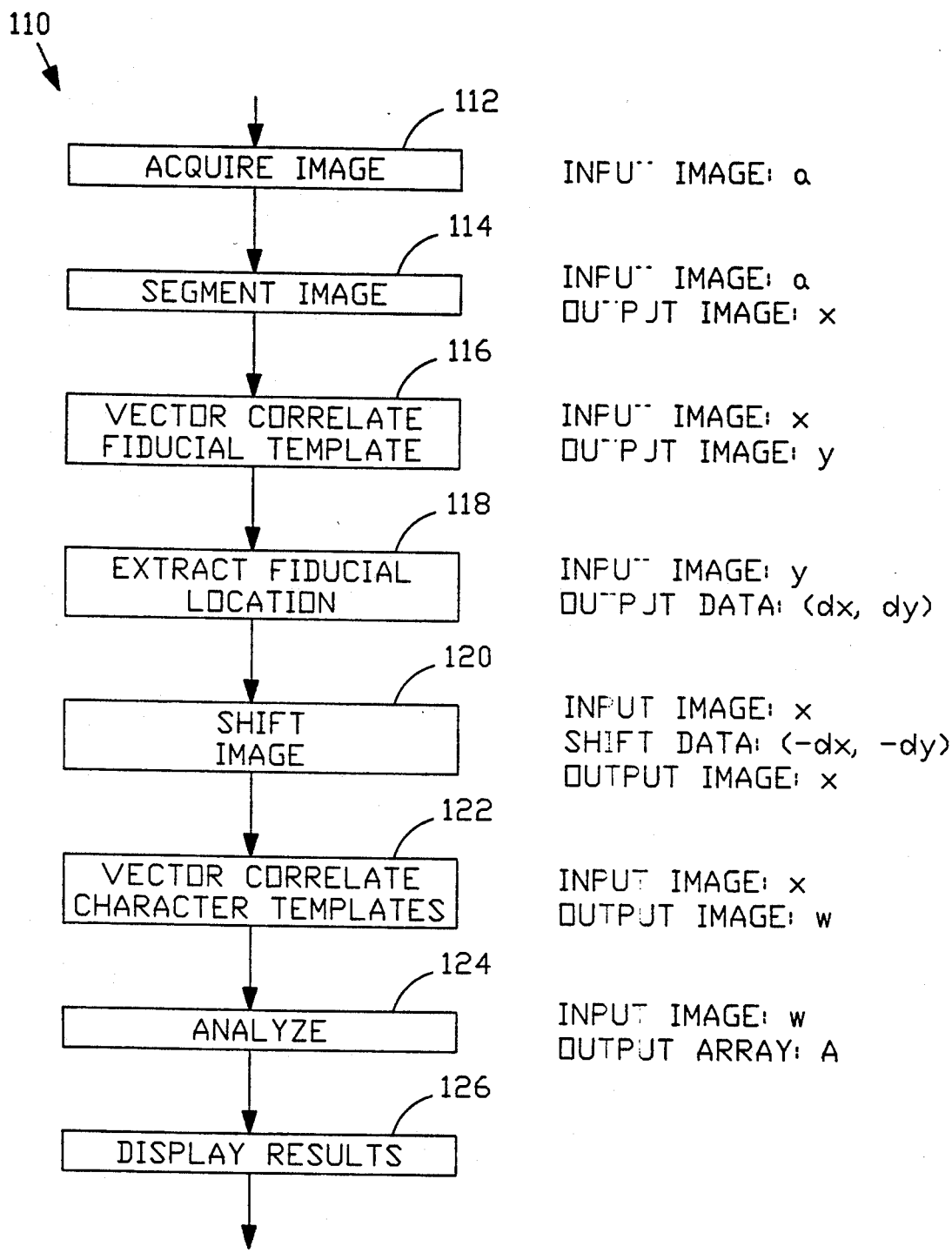
FIG. 10 is a flow chart showing position independent character recognition process with intermediate buffer names.

The position invariant character recognition method of the present invention adopts the same format as the rotation invariant OCR for both the standard method and the method under "concurrency". The number of processing steps are same and also the sequence of processing steps. The difference between the two methods are the specific contents of some of the steps described below. Here we need to identify a mark or symbol in the part that forms a reference mark or "fiducial" for our recognition process. We shall first teach this mark and the characters in their nominal position. During run phase, the distance of this mark from its "nominal" position is computed. The image is then shifted to its "nominal" position to do the final recognition task. An illustration of the location invariant OCR method 110 is shown in FIG. 10. The location invariant OCR method consists of the following eight steps:

(1) acquire an image 112,
(2) segment an image 114,
(3) vector correlate the "fiducial" template 116,
(4) find the fiducial location and its displacement from its "nominal" position 118,
(5) shift the character image to its "nominal"position 120,
(6) vector correlate the character templates 122,
(7) analyze the correlation image 124,
(8) display the final results 126.

In more detail, the first step in this method 110 is the image acquisition step. This step is done by the camera 24. The image of the characters under the camera is stored in an image buffer called "a". The acquired image is then processed by the parallel processor 28 with parallel processor memory 36. This step of image processing is called "image segmentation" and has been described in more detail under conventional OCR method in Section B. The segmentation step extracts the character image from the raw camera image and cleans it up to store it in a buffer called "x". The segmented image is then correlated to the "fiducial" template to extract a correlated image of the "fiducial" in buffer "y". The vector correlation is done by the parallel processor 28 with the parallel processor memory. The correlated image "y" is then processed by the CPU 30 to extract a location of the "fiducial". The displacement "(dx,dy)" in both x and y directions of the "fiducial" shows its distance and direction from the "nominal" position. The "nominal" position is the position where the "fiducial" and the characters in the image were initially taught. During the run phase, the character recognition method has to know the distance of the "fiducial" from its taught or "nominal" position. Next we shift the character image "y" to its "nominal" position by displacing it by (−dx,−dy) in both x and y directions respectively. The displaced image is also stored in buffer "x". This task is done by the parallel processor in parallel processing memory. The shifted image "x" of the segmented characters is then correlated to the character templates to extract the correlated image of the characters in buffer "w". The vector correlation is again done by the parallel processor in parallel processing memory. The correlated image of characters in buffer "w" is then analyzed by the CPU to obtain the recognized characters in buffer "A". The final result in array "A" and images "a", "x" and "y" are displayed on the monitor 38.

F. CONCURRENCY IN POSITION INVARIANT OCR

The position invariant OCR method also involves several computational steps. These steps are performed by different processing units. The processing order of these steps are not same as the processing units performing these tasks. Thus, the process of overlapping these steps are as complicated as the rotation invariant OCR under "concurrency". The eight steps involved in position invariant OCR are mentioned above in connection with FIG. 10. These steps can now be arranged by the processing units performing them. The camera performs the following steps:

(1) image acquisition 112.

The parallel processor 28 performs the following 4 steps:

(1) image segmentation,
(2) vector correlation with fiducial template 116,
(3) shifting the character image 120,
(4) vector correlation with character templates 122.

The CPU performs the following tasks:

(1) "fiducial" displacement data computation 118,
(2) analysis of correlation data 124.

The Display Monitor 38 performs the following task:
(1) display final results 126. The tasks mentioned above have to be arranged in an appropriate order so that they are performed in the right sequence (i.e. steps 112-126 and the different processing units overlap their tasks. The intermediate data has to be handled appropriately in order to achieve the two goals mentioned above.

The position invariant OCR under "concurrency" is illustrated in FIG. 11 by a flow chart 128. The position invariant OCR method will be explained with the example of a moving line shown in FIG. 6. As part 1 comes under the camera, a photoswitch triggers the camera to take a picture of part 1 in buffer "f" (step 129). At the end of the acquisition process, the image of part 1 in buffer "f" is transferred to buffer "a".

When part 2 triggers the camera, the camera starts taking a picture of part 2 in buffer "f". Simultaneously, the parallel processor starts segmenting the image of part 1 in buffer "a" to extract a segmented character image in buffer "x1" (step 132). The parallel processor then goes on to correlate the template of the "fiducial" with image "x1" to create a correlated image in buffer "y1" (step 134). When these tasks finish, the image of part 2 in buffer "f" is transferred to buffer "a" and, the segmented image of part 1 in buffer "x1" is transferred to buffer "x2" and the correlated fiducial image in buffer "y1" is transferred to buffer "y2".

Next, part 3 triggers the camera to start taking its picture in buffer "f". While the camera takes a picture, the parallel processor, segments the image of part 2 in buffer "a" to extract a segmented image of part 2 in buffer "x1", (step 132). It then correlates the fiducial template to create a correlated image of part 2 in buffer "y1", (step 134). Simultaneously, the CPU 30 computes the amount of shift "(dx1,dy1)" in x and y directions for part 1 from the correlated fiducial image of part 1 in buffer "y2". At the end of the camera, parallel processor and the CPU tasks, the image of part 3 in buffer "f" is transferred to buffer "a". The segmented image of part 1 in buffer "x2" is transferred to buffer "x3". The segmented image of part 2 in buffer "x1" is transferred to buffer "x2". The fiducial correlated image of part 2 in buffer "y1" is transferred to buffer "y2". Also, the shift parameters (dx1,dy1) in CPU memory are transferred to variables (dx2,dy2).

As part 4 arrives under the camera, the camera starts taking a picture of part 4 in buffer "f". The image of part 3 in buffer "a" is segmented by the parallel processor to extract an image in buffer "x1", (step 132). This image is then vector correlated with the fiducial template to extract a correlated image of part 3 in buffer "y1", (step 134). Simultaneously, the CPU computes the shift parameters (dx1,dy1) of part 2 in CPU memory, (step 138). Also, at the same time, the parallel processor shifts the segmented image of part 1 in buffer "x1" by (−dx2,−dy2) to place it at its "nominal" position, (step 130). The parallel processor then vector correlates the character templates with the shifted image of part 1 to create a character correlated image of part 1 (step 136). At the end of all these tasks, the image of part 4 in buffer "f" is transferred to buffer "a" (step 146). The segmented image of part 1 in buffer "x3" is moved to buffer "x4". The segmented image of part 2 in buffer "x2" is moved to buffer "x3". The segmented image of part 3 in buffer "x1" is moved to buffer "x2". Also, the fiducial correlated image of part 3 in buffer "y1" is moved to buffer "y2". The shift parameters (dx1,dy1) of part 2 are moved to variables (dx2,dy2).

Next, part 5 triggers the camera to start taking its picture in buffer "f". Simultaneously, the parallel processor starts segmenting the image of part 4 in buffer "a" to extract a segmented image in buffer "x1", (step 132). It then vector correlates the fiducial template with "x1" to create a correlated image in buffer "y1", (step 134). At the same time, the CPU extracts the shift parameters of part 3 in variables (dx1,dy1) from the correlated image in buffer "y2", (step 138). Simultaneously, the parallel processor shifts the segmented image of part 2 in buffer "x3" by parameters (−dx2,−dy2) to place it at its "nominal" position, (step 130). Also, at the same time, the parallel processor vector correlates the character templates with the segmented image of part 1 in buffer "x4" to create a character correlated image of part 1 in buffer "w", (step 136). At the end of the all these tasks the data are transferred. The image of part 5 in buffer "f" is transferred to buffer "a" (step 146). The shifted and segmented image of part 2 in buffer "x3" is transferred to buffer "x4". The segmented image "x2" of part 3 is transferred to buffer "x3". The segmented image "x1" of part 4 is moved to buffer "x2". The fiducial correlated image of part 4 in buffer "y1" is moved to buffer "y2". The shift data (dx1,dy1) of part 3 is moved to (dx2,dy2) in CPU memory. Also the character correlated image w of part 1 is transferred to buffer "v".

When part 6 triggers the camera, the camera starts taking a picture of part 6 into buffer "f". At the same time, the parallel processor starts segmenting the image of part 5 in buffer "a" to extract a character image of part 5 in buffer "x1", (step 132). This image is then correlated to the fiducial template to get a fiducial correlated image of part 5 in buffer "y1", (step 134). Simultaneously, the CPU extracts the shift parameters of part 4 from image "y2" into variables (dx1,dy1), (step 138). The parallel processor then shifts the segmented image of part 3 in buffer "x3" by parameters (−dx2,−dy2) into buffer "x3", (step 130). Also, the parallel processor vector correlates the character templates to the image of part 2 in buffer "x4" to create a character correlated image in buffer "w". Simultaneously, the CPU analyzes the character correlated image of part 1 in buffer "v" to extract the recognized characters into array "A", (step 140). At the end of all these tasks, the data is transferred and the results of part 1 in array "A" are displayed, (step 144).

G. ROTATION AND POSITION INVARIANT OCR

The rotation invariant OCR and position invariant OCR methods described above are of great importance to many manufacturing environments. In spite of their extensive applicability, there are many occasions where both these methods are required in conjunction to achieve correct final results. For example where characters can appear in any given orientation and position. Here, we have to first rotate the image so that the character lines appear horizontal across the image. We then need to locate a special character or "fiducial" to determine the location of the two strings in the image. We next place two windows on the image to separate out the characters. In this method we need to combine the eight steps (described before) involved in each method appropriately, so that correct final results can be achieved. A flow chart 148 of the combined rotation and position invariant OCR method is shown FIG. 12. This flow chart 148 shows that the combined method of OCR has eleven steps described below:

(1) acquire an image with the camera 150,
(2) segment the image with the parallel processor 152,
(3) extract the principle axis blob image with the parallel processor 154,
(4) compute principle axis parameters from the blob in CPU 156,
(5) rotate the segmented character image in the parallel processor 158,
(6) vector correlate the rotated image with the "fiducial" template in the parallel processor 160,
(7) find the "fiducial" location and its displacement from "nominal" position 162,
(8) shift the character image to its "nominal" position 164,
(9) vector correlate the character templates 166,
(10) analyze the correlated image 168,
(11) display the final results 170.

A detailed description of the individual steps are shown below.

Figure 12:
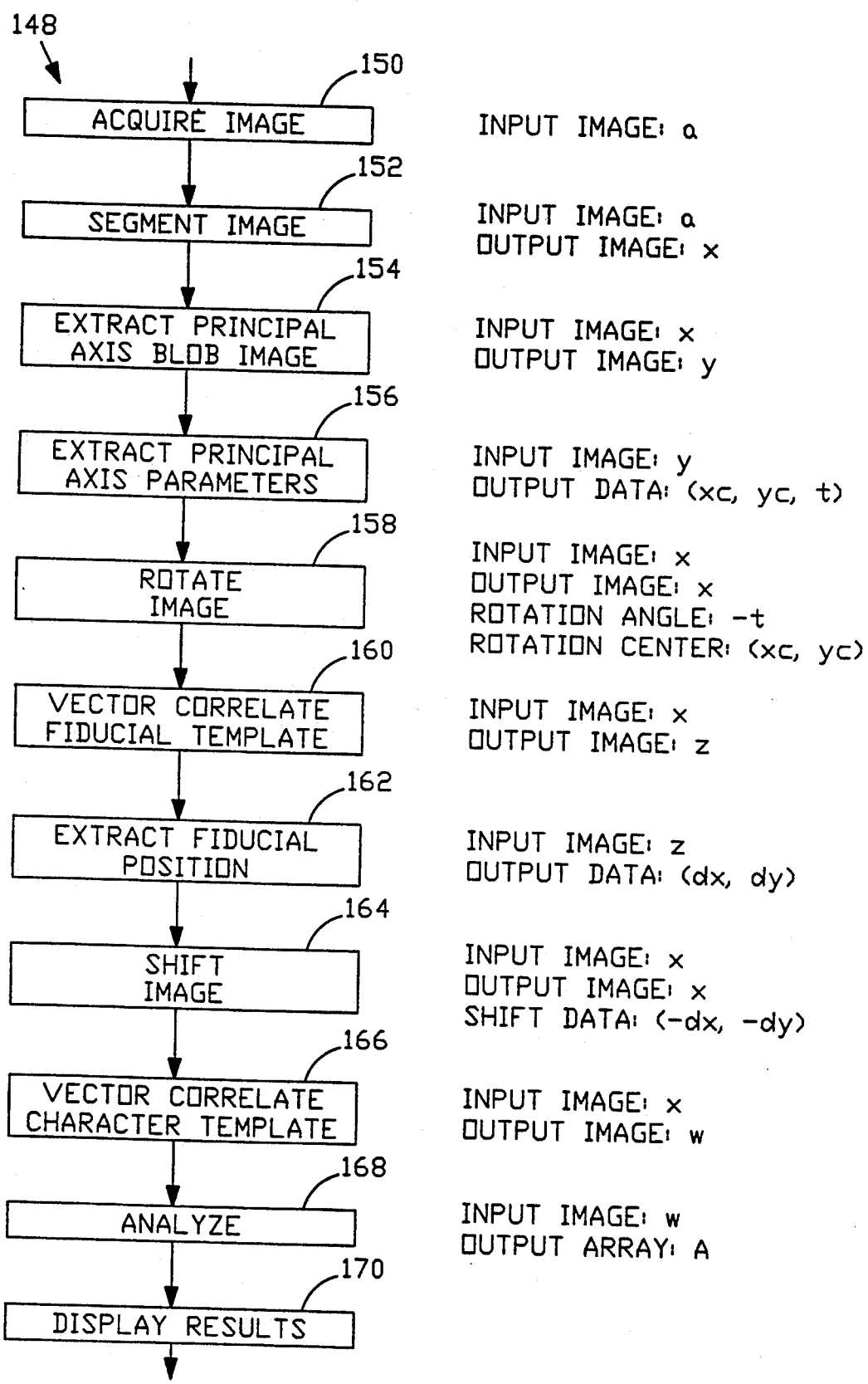
FIGS. 12 is a flow chart showing rotation and position independent character recognition with intermediate buffer names.

FIG. 12 illustrates a flow chart 148 of the individual steps in the rotation and position invariant OCR with intermediate buffer names. The first step is the image acquisition step where, the camera takes a picture of the characters in an image buffer called "a". This acquired image is then processed by the parallel processor in order to segment the characters out of the raw camera image (step 152). The image processing functions available in the AISI software functions library are used to for this purpose. Examples of some of these functions utilized for this step are provided in Section B of the conventional character recognition method. The final processed image is placed in buffer "x". Next, the parallel processor is used to extract a blob image from the segmented image "x" or the original camera image "a" (step 154). This blob represents the orientation and position of the characters in the image. Here we also use the image processing functions available in the AISI image processor. The final blob image is place in buffer "y" and the orientation and position parameters of the blob (step 156). The principal axis and its parameters are extracted are "(xc, yc)" for the x and y coordinates of the centroid and "t" for the orientation of the principal axis. After the computation of the principal axis parameters (xc, yc, t), we rotate the segmented character image in buffer "x" by the angle "−t" about the centroid (xc, yc) (step 158). As illustrated in FIG. 7 and explained in Section C, the image of the characters, after rotation can either be oriented right side up or up side down. The final image after rotation is also placed in image buffer "x".

The above steps rotate the character string so that it is oriented horizontally across the image. As mentioned before, the characters can either be oriented right side up or up side down, depending on the amount of rotation in the original segmented image "x". We next, vector correlate the "fiducial" template with the rotated and segmented character image in buffer "x" (step 160). The "fiducial" template is correlated in both the right side up and up side down positions of the template. We will assume here that the fiducial is chosen such that it is not a symmetric character or symbol is chosen as the "fiducial" such that it does not look the same in its right side up or up side down positions. An example of such a character is "F" or "G" or "Y". With this choice of the "fiducial" character, the template will only correlate in one direction, i.e. either right side up or up side down. The correlated fiducial image is stored in buffer "z". After correlating the fiducial template, we extract the location of the fiducial in the image from the fiducial correlated image in buffer "z" (step 162). This process is done in the CPU 30. Once the location of the "fiducial" is determined, its displacement (dx, dy) in x and y directions from the "nominal" position is stored in CPU memory. Next, we shift the segmented and rotated character image memory. Next, we shift the segmented and rotated character image in buffer "x" by the displacement (−dx, −dy) in order to place it back at its "nominal" position (step 164). This shifting process is done by the parallel processor 28 and the final image is stored in buffer "x". The segmented, rotated and shifted image in buffer "x" is then vector correlated with the character templates in both right side up and up side down positions of the character templates (step (166). The two correlated images are stored in buffer "w". This correlation step is performed by the parallel processor 28. The next process is the analysis step performed by the CPU 30 on the correlated images in buffer "w" (step 168). The analysis steps extracts the recognized characters for the right side up and up side down correlations in buffer "w" into arrays "A" and "B" respectively. As mentioned in section C (rotation invariant OCR method), a preset criteria, such as a predefined character string is used to determine the final set of recognized characters. The final step 170 is the display of the final results.

H. CONCURRENCY UNDER ROTATION AND POSITION INVARIANT OCR

FIG. 13 illustrates a flow chart 172 for rotation and position invariant OCR method under "concurrency" with intermediate buffer names. Here the "concurrency" model is even more complex than either the rotation invariant or position invariant methods. In both the rotation and position invariant OCR there is seven levels of "concurrency" for eleven different steps. The eleven steps described before are distributed between four processors: the camera 24, the parallel processors 28 and the CPU 30 and the Display Monitor 38. The distribution of tasks by processors is mentioned below. The camera 24 performs the following task:
  (1) image acquisition 174.

The parallel processor 28 performs the following tasks:
  (1) image segmentation 178.
  (2) principal axis blob image extraction 180,
  (3) vector correlation with "fiducial" template 182,
  (4) image rotation 176,
  (5) image shifting 184,
  (6) vector correlation with character templates 186.

The CPU 30 performs the following tasks:
  (1) principal axis parameter extraction 188,
  (2) "fiducial" location extraction 190,
  (3) analysis of character correlation data 192.

The Display Monitor 38 performs the following task:
(1) display of final results 196.

The flow chart 172 in FIG. 13 executes the steps above in the correct sequence and transfers the intermediate data so that the correct final results are obtained.

The process of "concurrency" for the combined rotation and position invariant method can be illustrated by the example of a manufacturing line shown in FIG. 5. As part 1 comes under the camera, the camera starts taking a picture of part 1 in buffer "f" (step 174). At the end of this picture taking process, the image data of part 2 under the camera, the camera starts acquiring the picture of part 2 in buffer "f". Simultaneously, the parallel processor 28 starts segmenting the picture of part 1 in buffer "a" to extract a segmented image of part 1 in buffer "x1" (step 118) and, then continues to extract the principal axis blob of part 1 from the image in buffer "x" into a buffer "y1" (step 180). At the end of these processes, the segmented image of part 1 in buffer "x1" is transferred to buffer "x2" and, the blob image of part 1 in buffer "y1" is move into buffer "y2".

Next, part 3 arrives under the camera. The camera starts taking a picture of part 3 in buffer "f" (step 174). Simultaneously the parallel processor, starts segmenting the image of part 2 in buffer "a" into buffer "x1" (step 178) and, continues to extract the principal axis blob of part 2 into buffer "y1" (step 180). At the same time, the CPU 30 extracts the principal axis parameters (x and y centroid and the orientation angle) of part 1 in buffer "y2" into variables (xc1, yc1, t1) (step 188). At the end of these tasks, the image of part 3 in buffer "f" is transferred to buffer "a" (step 198). The segmented image of part 1 in buffer "x2" is moved into buffer "x3". The segmented image of part 2 in buffer "x1" is moved into buffer "x2". The principal axis blob image of part 2 in buffer "y1" is moved into buffer "y2". The principal axis parameters (xc1, yc1, t1) of part 1 are moved into variables (xc2, yc2, t2).

When part 4 arrives under the camera, the camera starts taking a picture of part 4 into buffer "f" (step 174). Simultaneously, the parallel processor segments the image of part 3 in buffer "a" into buffer "x1" and, then extracts the principal axis blob of part 3 into buffer "y1" (step 180). The CPU, at the same time, extracts the principal axis blob parameters (sc1, yc1, t1) from the image of part 2 in buffer "y2" (step 188). The parallel processor then rotates the image of part 1 in buffer "x3" by the parameters (xc2, yc2, −t2) into the same buffer "x3" (step 176). At the end of these tasks, the data are transferred (step 198). The image of part 4 in buffer "f" is vector correlated with the fiducial template and the results--, and after "x4" insert--(step 182) moved into buffer "a". The rotated image of part 1 in buffer "x3" is moved into buffer "x4". The segmented image of part 3 in buffer "x1" is moved into buffer "x2". The principal axis blob image of part 3 in buffer "y1" is moved into buffer "y2". The rotation parameters (xc1, yc1, t1) of part 2 are moved into variables (xc2, yc2, t2).

Next, part 5 arrives under the camera. The camera starts taking a picture of part 5 into buffer "f". Simultaneously, the parallel processor segments the image of part in buffer "a" into buffer "x1" step 178 and, then extracts the principal axis blob image of part 4 into buffer "y1" (step 180). At the same time, the CPU extracts the principal axis parameters of part 3 from the image "y2" into variables (xc1, yc1, t1) (step 188). The image of part 2 in buffer "x3" is rotated by parameters (xc2, yc2, −t2) into buffer "x3" (step 176). The parallel processor then vector correlates the fiducial template to the image of part 1 in buffer "x4" to produce a fiducial correlation image into buffer "x4" to produce a fiducial correlation image into buffer "z1" (step 182). When all these tasks are done the following data are transferred (step 198):

image "f" of part 5 to image "a",
image "x4" of part 1 to image "x5",
image "x3" of part 2 to image "x4",
image "x2" of part 3 to image "x3",
image "x1" of part 4 to image "x2",
image "z1" of part 1 to image "z2",
image "y1" of part 4 to image "y2",
rotation data (xc1, xc2, t2) of part 3 to (xc2, yc2, t2).

When part 6 comes under the camera, the camera starts taking a picture of part 6 into buffer "f" (step 174). Simultaneously, the parallel processor extracts the segmented image of part 5 into buffer "x1" (step 178) and, continues to extract the principal axis blob image of part 5 into buffer "y1"(step 180). Simultaneously, the CPU extracts the principal axis parameters (xc2, yc2, −t2) into buffer "x3" by then vector correlates the fiducial template with the image of part 2 in buffer "x4" to extract the fiducial correlated image of part 2 into buffer "z1" (step 182). The CPU, at the same time, extracts the fiducial location parameters (dx1, dy1) of part 1 from the fiducial correlation image of part 1 in buffer "z2" (step 190). At the end of all these tasks the following data are transferred (step 198):

image "f" of part 6 to image "a",
image "x5" of part 1 to image "x6",
image "x4" of part 2 to image "x5",
image "x3" of part 3 to image "x4",
image "x2" of part 4 to image "x3",
image "x1" of part 5 to image "x2",
image "z1" of part 2 to image "z2", image "y1" of part 5 to image "y2",
rotation data (xc1, xc2, t2) of part 4 to (xc2, yc2, t2),
shift data (dx1, dy1) of part 1 to (dx2, dy2).

Next, part 7 comes by and, the camera starts taking a picture of part 7 in buffer "f" (step 174). The parallel processor, at the same time, segments the picture of part 6 in buffer "a" into buffer "x1" (step 178) and, continues to extract the principal axis blob image of part 6 into buffer "y1" (step 180). Simultaneously, the CPU extracts the principal axis parameters of part 5 from image "y2" into variables (xc1, yc1,t1) (step 188). The parallel processor then rotates the image of (xc2, yc2, t2) (step 176). The parallel processor then vector correlates the fiducial template with the image of part 3 in buffer "x4" to extract a fiducial correlated image of part 3 into buffer "z1" (step 182). The CPU simultaneously, extracts the shift parameters (dx1, dy1) of part 2 from image in buffer "z2"(190). The image of part 1 in buffer "x6" by the parallel processor (step 184). At the end of these tasks the following data are transferred (step 198):

image "f" of part 7 to image "a",
image "x6" of part 1 to image "x7",
image "x5" of part 2 to image "x6",
image "x4" of part 3 to image "x5",
image "x3" of part 4 to image "x4",
image "x2" of part 5 to image "x3",
image "x1" of part 6 to image "x2",
image "z1" of part 3 to image "z2",
image "y1" of part 6 to image "y2",
rotation data (xc1, xc2, t2) of part 5 to (xc2, yc2, t2),
shift data (dx1, dy1) of part 2 to (dx2, dy2).

Next, part 8 comes under the camera. The camera starts taking a picture of part 8 into buffer "f" (step 174). Simultaneously, the parallel processor starts segmenting the image of part 7 into buffer "x1" (step 178) and continues to extract the principal axis blob image of part 7 into buffer "y1"(step 180). At the same time, the CPU starts extracting the principal axis parameters (xc1, yc1, t1) from image "y2" of part 6 (step 188). The parallel processor then rotates the image of part 5 in buffer "x3" by parameters (xc2, yc2, −t2) into buffer "x3" (step 176). The parallel processor then vector correlates the fiducial template with the segmented and rotated image of part 4 in buffer "x4" to create the fiducial correlated image of part 4 in buffer "z1" (step 182). The CPU, at the same time, extracts the shift parameters (dx1, dy1) of part 3 from the fiducial correlated image in buffer "z2" (step 190). The parallel processor then shifts the rotated and segmented image of part 2 in buffer "x6" by shift parameters (−dx2, −dy2) (step 184). The segmented, rotated and shifted image of part 1 in buffer "x7" is then vector correlated to the character templates to create a character correlated image in buffer "w" (step 186). At the end of these tasks the data are transferred as follows (step 198):

image "f" of part 8 to image "a",
image "x6" of part 2 to image "x7",
image "x5" of part 3 to image "x6",
image "x4" of part 4 to image "x5",
image "x3" of part 5 to image "x4",
image "x2" of part 6 to image "x3",
image "x1" of part 7 to image "x2",
image "z1" of part 4 to image "z2",
image "y1" of part 7 to image "y2",
image "w" of part 1 to image "v",
rotation data (xc1, xc2, t2) of part 6 to (xc2, yc2, t2),
shift data (dx1, dy1) of part 3 to (dx2, dy2).

Next, part 9 comes under the camera, and the camera starts taking a picture of part 9 into buffer "f" (step 174). Simultaneously, the parallel processor starts segmenting the image of part 8 in buffer "a" into buffer "x1" (step 178) and, continues to extract the principal axis blob image of part 8 into buffer "y1" (step 180). The CPU, at the same time, extracts the principal axis parameters of part 7 into variables (xc1, yc1, t1) from image "y2" (step 188). The parallel processor then rotates the image of part 6 in buffer "x3" by parameters (xc2, yc2, −t2) into buffer "x3" (step 176). The parallel processor then vector correlates the fiducial template with the image of part 5 in buffer "x4" to extract a fiducial correlated image of part 5 into buffer "z1" (step 182). Simultaneously, the CPU extracts the fiducial location parameters (dx1, dy1) from the fiducial correlated image "z2" of part 4 (step 190). The parallel processor then shifts the rotated image of part 3 in buffer "x6" by parameters (−dx2, −dy2) (step 184). The parallel processor then vector correlates the character templates with the segmented, rotated and shifted image of part 2 in buffer "x7" (step 186). The character correlated image of part 1 in buffer "v" is then analyzed by the CPU to extract the recognized character set "A" and "B" (step 192). The sets "A" and "B" correspond to the right side up and up side down correlations of the character templates. The final set of recognized characters can now be extracted by a preset criteria, such as, matching to a predefined string, as mentioned before. At the end of all these tasks the final results are displayed (step 196) and the data are transferred (step 198).

It will be appreciated that the AISI machine vision system is but one example of hardware available to implement the techniques of the present invention, and that other image processing systems, off the shelf, or custom made, may also be employed. Also, it should be noted that the techniques of the present invention may be used for recognition of other image features besides characters including, for example, symbols or visible defects in manufactured parts. From the foregoing it can be seen that the present invention provides an image processing system and method which can perform rotation and/or orientation invariant character recognition with a high degree of accuracy at very high speeds. Those skilled in the art can appreciate that other advantages can be obtained from the use of this invention and that modifications may be made without departing from the true spirit of the invention after studying the specification, drawings and following claims.

I claim:

1. A method for rapid recognition of a sequence of features in an optical recognition system having a camera means, parallel processing means, I/O means, parallel memory means, CPU means and display means, said method comprising the steps of:

acquiring an image with said camera of a first feature in said sequence;

storing said image in a first buffer;

transferring said image in said first buffer to a second buffer;

segmenting said image in said second buffer and storing said segmented image in a third buffer;

vector correlating said segmented image in said third buffer with feature templates to create a correlation image in a fourth buffer;

said segmentation and correlation steps being done by said parallel processing means simultaneously while said step of acquiring an image acquires new images in said sequence;

transferring said vector correlation from said fourth buffer to a fifth buffer;

analyzing said vector correlation in said fifth buffer using said CPU means after two images are acquired by said camera to recognize said features; and transferring said recognized feature into an array, wherein said camera, parallel processor and said CPU can process from an input buffer and output it to an output buffer without disturbing the contents of the other components in the system, whereby the operation of said camera means, said parallel processing means, and CPU means overlap to provide greater processing speed.

2. A method for rapid recognition of a sequence of objects by an Optical Character Recognition System having a camera means, parallel processing means, CPU means, display means, and I/O means, said method comprising the steps of:

acquiring an image with said camera of a first object in said sequence;

storing said image of said first object in a first buffer;

transferring said image of said first object in said first buffer to a second buffer;

acquiring an image with said camera of a second object in said sequence;

storing said image of said second object in said first buffer;

segmenting said image of said first object in said second buffer using said parallel processing means to create a segmented image in a third buffer;

vector correlating said segmented image of said first object in said third buffer with character templates using said parallel processing means to create a correlation image in a fourth buffer;

transferring said image of said second object in said first buffer to said second buffer;

transferring said correlated image of said first object in said fourth buffer to a fifth buffer;

acquiring an image with said camera of a third object in said sequence;

storing said image of said third object in said first buffer;

segmenting said image of said second object in said second buffer using said parallel processing means to create a segmented image in said third buffer;

vector correlating said segmented image of said second object in said third buffer with character templates using said parallel processing means to create a correlation image in said fourth buffer;

analyzing said correlation image of said first object in said fifth buffer using said CPU means to recognize said characters;

storing said recognized characters into an array;

displaying in said monitor said recognized characters of said first object in said array, said segmented image of said second object in said third buffer, and said image of said first object in said first buffer;

transferring said image of said third object in said first buffer to said second buffer; and transferring said correlated image of said second object in said fourth buffer to said fifth buffer.

3. The method of rapid recognition of objects of claim 1, wherein said steps performed by said camera means, said parallel processor means, said CPU means and said display means are performed in parallel.

4. A method of rotation invariant recognition of a sequence of objects in an Optical Character Recognition system having a camera means, parallel processing means, CPU means, I/O means and display means, said method comprising the steps of:

acquiring an image with said camera of a first object in said sequence;

storing said image of said first object in a first buffer; and transferring said image of said first object in said first buffer to a second buffer;

acquiring an image with said camera of a second object in said sequence;

storing said image of said second object in said first buffer;

segmenting using said parallel processing means said image of said first object in said second buffer to create a segmented image in a third buffer;

extracting blob image for principal axis using said parallel processing means from said segmented image of said first object in said third buffer to create a blob image in a fourth buffer;

transferring said segmented image of said first object in said third buffer to a fifth buffer;

transferring said blob image of said first object in said fourth buffer to a sixth buffer;

transferring said image of said second object in said first buffer to said second buffer;

acquiring an image with said camera of a third object in said sequence;

storing said image of said third object in said first buffer;

segmenting using said parallel processing means said image of said second object in said second buffer to create a segmented image in said third buffer;

extracting blob image for principal axis using said parallel processing means from said segmented image of said second object in said third buffer to create a blob image in fourth buffer;

computing principal axis using said CPU means from said blob image of said first object in said sixth buffer to determine the centroid and orientation of said first object in a first array;

transferring said centroid and orientation of said first object in said first array to a second array;

transferring said image of said third object in said first buffer to said second buffer;

transferring said segmented image of said second object in said third buffer to said fifth buffer;

transferring said blob image of said second object in said fourth buffer to said sixth buffer;

transferring said segmented image of said first object in said fifth buffer to a seventh buffer;

acquiring an image with said camera of a fourth object in said sequence;

storing said image of said fourth object in said first buffer;

segmenting using said parallel processing means said image of said third object in said second buffer to create a segmented image in said third buffer;

extracting blob image for principal axis using said parallel processing means from said segmented image of said third object in said third buffer to create a blob image in said fourth buffer;

computing principal axis using said CPU means from said blob image of said second object in said sixth buffer to create the centroid and orientation of said second object in said first array;

rotating using parallel processing means said image of said first object in said seventh buffer with centroid and orientation in said second array to create a rotated image in an eighth buffer;

vector correlating using parallel processing means said rotated image of said first object in said eighth buffer with both erect and inverted character templates to create a correlated image in a ninth buffer;

transferring said correlated image of said first object in said ninth buffer to a tenth buffer;

transferring said segmented image of said second object in said fifth buffer to said seventh buffer;

transferring said centroid and orientation of said second object in said first array to said second array;

transferring said segmented image of said third buffer to said fifth buffer;

transferring said blob image of said third object in said fourth buffer to said sixth buffer;

transferring said image of said fourth object in said first buffer to said second buffer;

acquiring an image with said camera of a fifth object in said sequence;

storing said image of said fifth object in said first buffer;

segmenting using said parallel processing means said image of said fourth object in said second buffer to create a segmented image in said third buffer;

extracting blob image for principal axis using said parallel processing means from said segmented image of said fourth object in said third buffer to create a blob image in said fourth buffer;

computing principal axis using said CPU means from said blob image of said third object in said sixth buffer to create the centroid and orientation of said third object in said first array;

rotating using parallel processing means said image of said second object in said seventh buffer with centroid and orientation in said second array to create a rotated image in eighth buffer;

vector correlating using parallel processing means said rotated image of said second object in said eighty buffer with both erect and inverted character templates to create a correlated image in said ninth buffer;

analyzing using said CPU means said correlation image of said first object in said tenth buffer to recognize said characters;

storing said recognized characters into a third array;

display said recognized characters of said first object in said third array, said segmented image of said second object in said seventh buffer, and said image of said fifth object in said first buffer;

transferring said correlated image of said second object in said ninth buffer to said tenth buffer;

transferring said segmented image of said third object in said fifth buffer to said seventh buffer;

transferring said centroid and orientation of said third object in said first array to said second array;

transferring said segmented image of said fourth object in said third buffer to said fifth buffer;

transferring said blob image of said fourth object in said fourth buffer to said sixth buffer;

transferring said image of said fifth object in said first buffer to said second buffer.

5. A method of position invariant recognition of a sequence of objects in an Optical Character Recognition system having a camera means, parallel processing means, CPU means, I/O means and display means, said method comprising the steps of:

acquiring an image with said camera of a first object in said sequence;

storing said image of said first object in a first buffer;

transferring said image of said first object in said first buffer to a second buffer;

acquiring an image with said camera of a second object in said sequence;

storing said image of said second object in said first buffer;

segmenting using said parallel processing means said image of said first object in said second buffer to create a segmented image in a third buffer;

vector correlating fiducial template using said parallel processing means said segmented image of said first object in said third buffer to create a fiducial correlated image in a fourth buffer;

transferring said segmented image of said first object in said third buffer to a fifth buffer;

transferring said fiducial correlated image of said first object in said fourth buffer to a sixth buffer;

transferring said image of said second object in said first buffer to said second buffer;

acquiring an image with said camera of a third object in said sequence;

storing said image of said third object in said first buffer;

segmenting using said parallel processing means said image of said second object in said second buffer to create a segmented image in said third buffer;

vector correlating said fiducial template using said parallel processing means said segmented image of said second object in said third buffer to create a fiducial correlated image in said fourth buffer;

computing fiducial location using said CPU means from said fiducial correlated image of said first object in said sixth buffer to determine the displacement of said first object in a first array;

transferring said segmented image of said first object in said fifth buffer to a seventh buffer;

transferring said displacement of said first object in said first array to a second array;

transferring said segmented image of said second object in said third buffer to said fifth buffer;

transferring said fiducial correlated image of said second object in said fourth buffer to said sixth buffer;

transferring said image of said third object in said first buffer to said second buffer;

acquiring an image with said camera of a fourth object in said sequence;

storing said image of said fourth object in said first buffer;

segmenting using said parallel processing means said image of said third object in said second buffer to create a segmented image in said third buffer;

vector correlating said fiducial template using said parallel processing means said segmented image of said third object in said third buffer to create a blob image in said fourth buffer;

computing fiducial location using said CPU means from said fiducial correlation image of said second object in said sixth buffer to create the displacement of said second object in said first array;

shifting using parallel processing means said image of said first object in said seventh buffer with displacement in said second array to create a shifted image in eighth buffer;

vector correlating using parallel processing means said shifted image of said first object in said eighth buffer with character templates to create a correlated image in a ninth buffer;

transferring said correlated image of said first object in said ninth buffer to a tenth buffer;

transferring said segmented image of said second object in said fifth buffer to said seventh buffer;

transferring said displacement of said second object in said first array to a second array;

transferring said segmented image of said third object in said third buffer to said fifth buffer;

transferring said fiducial correlation image of said third object in said fourth buffer to said sixth buffer;

transferring said image of said fourth object in said first buffer to said second buffer;

acquiring an image with said camera of a fifth object in said sequence;

storing said image of said fifth object in said first buffer;

segmenting using said parallel processing means said image of said fourth object in said second buffer to create a segmented image in said third buffer;

vector correlating with fiducial template using said parallel processing means said segmented image of said fourth object in said third buffer to create a fiducial correlated image in said fourth buffer;

computing fiducial location using said CPU means from said fiducial correlated image of said third object in said sixth buffer to create the displacement of said third object in a first array;

shifting using parallel processing means said image of said second object in said seventh buffer with displacement in said second array to crate a shifted image in eighth buffer;

vector correlating using parallel processing means said rotated image of said second object in said eighth buffer with character templates to create a correlated image in a ninth buffer;

analyzing using said CPU means said correlation image of said first object in said tenth buffer to recognize said characters;

storing said recognized characters into a third array;

display said recognized characters of said first object in said third array, said segmented image of said second object in said seventh buffer, and said image of said fifth object in said first buffer;

transferring said correlated image of said second object in said ninth buffer to a tenth buffer;

transferring said segmented image of said third object in said fifth buffer to said seventh buffer;

transferring said displacement of said third object in said first array to said second array;

transferring said segmented image of said fourth object in said third buffer to said fifth buffer;

transferring said fiducial correlated image of said fourth object in said fourth buffer to said sixth buffer; and transferring said image of said fifth object in said first buffer to said second buffer.

6. The method of position invariant recognition of objects of claim 2, wherein the steps performed by said camera means, said parallel processor means, said CPU means and said display means are performed in parallel.

7. A method of rotation and position invariant recognition of a sequence of objects in an Optical Character Recognition system having a camera means, parallel processing means, CPU means, I/O means and display means, said method comprising the steps of:

acquiring an image with said camera of a first object in said sequence;

storing said image of said first object in a first buffer;

transferring said image of said first object in said first buffer to a second buffer;

acquiring an image with said camera of a second object in said sequence;

storing said image of said second object in said first buffer;

segmenting using said parallel processing means said image of said first object in said second buffer to create a segmented image in a third buffer;

extracting blob image for principal axis using said parallel processing means from said segmented image of said first object in said third buffer to create a blob image in a fourth buffer;

transferring said segmented image of said first object in said third buffer to a fifth buffer;

transferring said blob image of said first object in said fourth buffer to a sixth buffer;

transferring said image of said second object in said first buffer to said second buffer;

acquiring an image with said camera of a third object in said sequence;

storing said image of said third object in said first buffer;

segmenting using said parallel processing means said image of said second object in said second buffer to create a segmented image in said third buffer;

extracting blob image for principal axis using said parallel processing means from said segmented image of said second object in said third buffer to create a blob image in said fourth buffer;

computing principal axis using said CPU means from said blob image of said first object in said sixth buffer to create the centroid and orientation of said first object in a first array;

transferring said segmented image of said first object in said fifth buffer to a seventh buffer;

transferring said centroid and orientation of said first object in said first array to a second array;

transferring said segmented image of said second object in said third buffer to said fifth buffer;

transferring said blob image of said second object in said fourth buffer to said sixth buffer;

transferring said image of said third object in said first buffer to said second buffer;

acquiring an image with said camera of a fourth object in said sequence;

storing said image of said fourth object in said first buffer;

segmenting using said parallel processing means said image of said third object in said second buffer to create a segmented image in said third buffer;

extracting blob image for principal axis using said parallel processing means from said segmented image of said third object in said third buffer to create a blob image in said fourth buffer;

computing principal axis using said CPU means from said blob image of said second object in said sixth buffer to create the centroid and orientation of said second object in said first array;

rotating using parallel processing means said image of said first object in said seventh buffer with centroid and orientation in said second array to create a rotated image in eighth buffer;

vector correlating fiducial template using said parallel processing means said segmented image of said first object in said eighth buffer to create a fiducial correlated image in a ninth buffer;

transferring said rotated image of said first object in said eighth buffer to a tenth buffer;

transferring said fiducial correlated image of said first object in said ninth buffer to a eleventh buffer;

transferring said segmented image of said second object in said fifth buffer to said seventh buffer;

transferring said centroid and orientation of said second object in said first array to said second array;

transferring said segmented image of said third object in said third buffer to said fifth buffer;

transferring said blob image of said third object in said fourth buffer to said sixth buffer;

transferring said image of said fourth object in said first buffer to said second buffer;

acquiring an image with said camera of a fifth object in said sequence;

storing said image of said fifth object in said first buffer;

segmenting using said parallel processing means said image of said fourth object in said second buffer to create a segmented image in said third buffer;

extracting blob image for principal axis using said parallel processing means from said segmented image of said fourth object in said third buffer to create a blob image in said fourth buffer;

computing principal axis using said CPU means from said blob image of said third object in said sixth buffer to create the centroid and orientation of said third object in said first array;

rotating using parallel processing means said image of said second object in said seventh buffer with centroid and orientation in said second array to create a rotated image in eighth buffer;

vector correlating fiducial template using said parallel processing means said segmented image of said second object in said eighth buffer to create a fiducial correlated image in a ninth buffer;

computing fiducial location using said CPU means from said fiducial correlated image of said first object in said eleventh buffer to create the displacement of said first object in a third array;

transferring said rotated image of said first object in said tenth buffer to a twelfth buffer;

transferring displacement of said first object in said third array to a fourth array;

transferring said rotated image of said second object in said eighth buffer to said tenth buffer;

transferring said fiducial correlated image of said second object in said ninth buffer to said eleventh buffer;

transferring said segmented image of said third object in said fifth buffer to said seventh buffer;

transferring said centroid and orientation of said third object in said first array to said second array;

transferring said segmented image of said fourth object in said fourth buffer to said fifth buffer;

transferring said blob image of said fourth object in said fourth buffer to said sixth buffer;

transferring said image of said fifth object in said first buffer to said second buffer;

acquiring an image with said camera of a sixth object in said sequence;

storing said image of said sixth object in said first buffer;

segmenting using said parallel processing means said image of said fifth object in said second buffer to create a segmented image in said third buffer;

extracting blob image for principal axis using said parallel processing means from said segmented image of said fifth object in said third buffer to create a blob image in said fourth buffer;

computing principal axis using said CPU means from said blob image of said fourth object in said sixth buffer to create the centroid and orientation of said fourth object in said first array;

rotating using parallel processing means said image of said third object in said seventh buffer with centroid and orientation in said second array to create a rotated image in eighth buffer;

vector correlating fiducial template using said parallel processing means said segmented image of said third object in said eighth buffer to create a fiducial correlated image in a ninth buffer;

computing fiducial location using said CPU means from said fiducial correlated image of said second object in said eleventh buffer to create the displacement of said second object in said third array;

shifting using parallel processing means said image of said first object in said twelfth buffer with displacement in said fourth array to create a shifted image in thirteenth buffer;

vector correlating using parallel processing means said shifted image of said first object in said thirteenth buffer with character templates to create a correlated image in a fourteenth buffer;

transferring said correlated image of said first object in said fourteenth buffer to a fifteenth buffer;

transferring said rotated image of said second object in said tenth buffer to said twelfth buffer;

transferring said displacement of said second object in said third array to said fourth array;

transferring said rotated image of said third object in said eighth buffer to said tenth buffer;

transferring said fiducial correlated image of said third object in said ninth buffer to said eleventh buffer;

transferring said segmented image of said fourth object in said fifth buffer to said seventh buffer;

transferring said centroid and orientation of said fourth object in said first array to said second array;

transferring said segmented image of said fifth object in said third buffer to said fifth buffer;

transferring said blob image of said fifth object in said fourth buffer to said sixth buffer;

transferring said image of said sixth object in said first buffer to said second buffer;

acquiring an image with said camera of an seventh object in said sequence;

storing said image of said seventh object in said first buffer;

segmenting using said parallel processing means said image of said sixth object in said second buffer to create a segmented image in said third buffer;

extracting blob image for principal axis using said parallel processing means from said segmented image of said sixth object in said third buffer to create a blob image in said fourth buffer;

computing principal axis using said CPU means from said blob image of said fifth object in said sixth buffer to create the centroid and orientation of said fifth object in said first array;

rotating using parallel processing means said image of said fourth object in said seventh buffer with centroid and orientation in said second array to create a rotated image in eighth buffer;

vector correlating fiducial template using said parallel processing means said segmented image of said fourth object in said eighth buffer to create a fiducial correlated image in a ninth buffer;

computing fiducial location using said CPU means from said fiducial correlated image of said third object in aid eleventh buffer to create the displacement of said third object in a third array;

shifting using parallel processing means said image of said second object in said twelfth buffer with displacement in said fourth array to create a shifted image in thirteenth buffer;

vector correlating using parallel processing means said shifted image of said second object in said thirteenth buffer with character templates to create a correlated image in a fourteenth buffer;

analyzing using said CPU means said correlation image of said first object in said fifteenth buffer to recognize said characters;

storing said recognized characters into a fifth array;

display said recognized characters of said first object in said fifth array, said segmented image of said second object in said twelfth buffer, and said image of said sixth object in said first buffer;

transferring said correlated image of said second object in said fourteenth buffer to said fifteenth buffer;

transferring said rotated image of said third object in said tenth buffer to said twelfth buffer;

transferring said displacement of said third object in said third array to said fourth array;

transferring said rotated image of said fourth object in said eighth buffer to said tenth buffer;

transferring said fiducial correlated image of said fourth object in said ninth buffer to said eleventh buffer;

transferring said segmented image of said fifth object in said fifth buffer to said seventh buffer;

transferring said centroid and orientation of said fifth object in said first array to said second array;

transferring said segmented image of said sixth object in said third buffer to said fifth buffer;

transferring said blob image of said sixth object in said fourth buffer to said sixth buffer; and transferring said image of said seventh object in said first buffer to said second buffer.

8. The method of rotation and position invariant recognition of objects in claim 4, wherein the steps performed by said camera means, said parallel processor means, said CPU means and said display means are performed in parallel.

* * * * *